United States Patent [19]
Powell

[11] Patent Number: 5,884,278
[45] Date of Patent: Mar. 16, 1999

[54] RETAIL STORE AND METHOD EMPLOYING MULTIPLE NETWORK INTERFACES AT EACH CASH REGISTER, AND RECEIVING SIGNALS FROM PORTABLE CARDS AT EACH CASH REGISTER

[76] Inventor: Ken R. Powell, P.O. Box 6265, Athens, Ga. 30604

[21] Appl. No.: 799,688

[22] Filed: Feb. 11, 1997

[51] Int. Cl.[6] .................................................. G06F 17/60
[52] U.S. Cl. ............................. 705/14; 235/375; 235/383
[58] Field of Search .............................. 705/14; 235/375, 235/383

[56] References Cited

U.S. PATENT DOCUMENTS

| | | | |
|---|---|---|---|
| 4,674,041 | 6/1987 | Lemon et al. ............................. | 705/14 |
| 4,882,675 | 11/1989 | Nichtberger et al. ...................... | 705/14 |
| 5,047,614 | 9/1991 | Bianco ..................................... | 235/385 |
| 5,192,854 | 3/1993 | Counts ..................................... | 235/375 |
| 5,256,863 | 10/1993 | Ferguson et al. .......................... | 380/24 |
| 5,471,669 | 11/1995 | Lidman .................................... | 235/383 |
| 5,490,060 | 2/1996 | Malec et al. .............................. | 705/10 |

OTHER PUBLICATIONS

UPC Coupon Code Guidelines Manual, reprinted Oct. 1994, Uniform Code Council, Inc., Dayton, Ohio

*Primary Examiner*—Emanuel Todd Voeltz
*Assistant Examiner*—Raquel Alvarez
*Attorney, Agent, or Firm*—Jerome D. Jackson

[57] ABSTRACT

A computer network for a retail store. The computer network collects coupon redemption information from a plurality of cash registers and periodically sends the redemption information to a market research center, allowing the correlation of coupon redemptions with customer demographic data. Each cash register includes a special computer for coupon redemption compilation. The special computer interfaces to conventional cash register computer hardware without requiring a substantial change to cash register computer software.

11 Claims, 27 Drawing Sheets

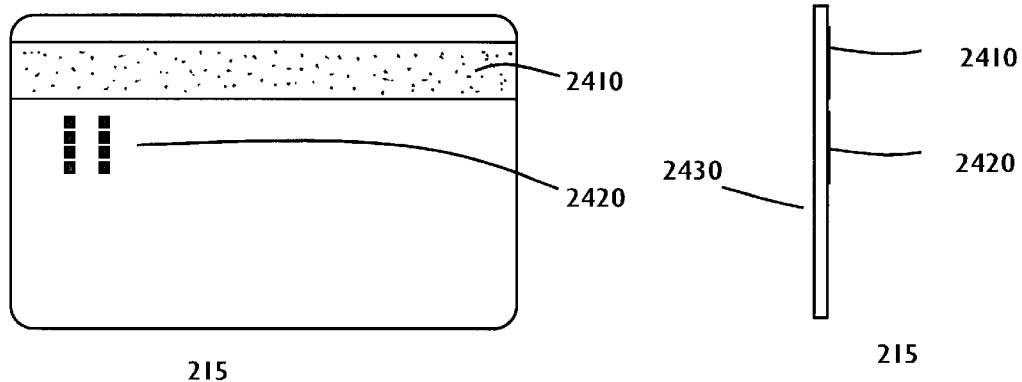
Fig. 5A  Fig. 5B
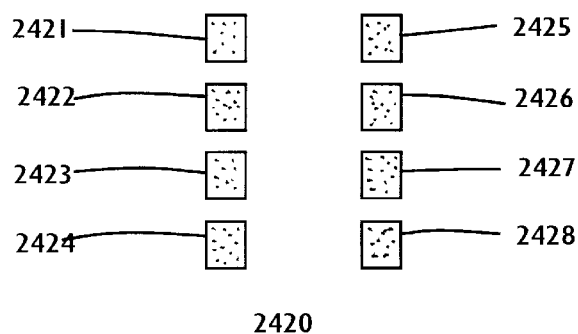
Fig. 5C

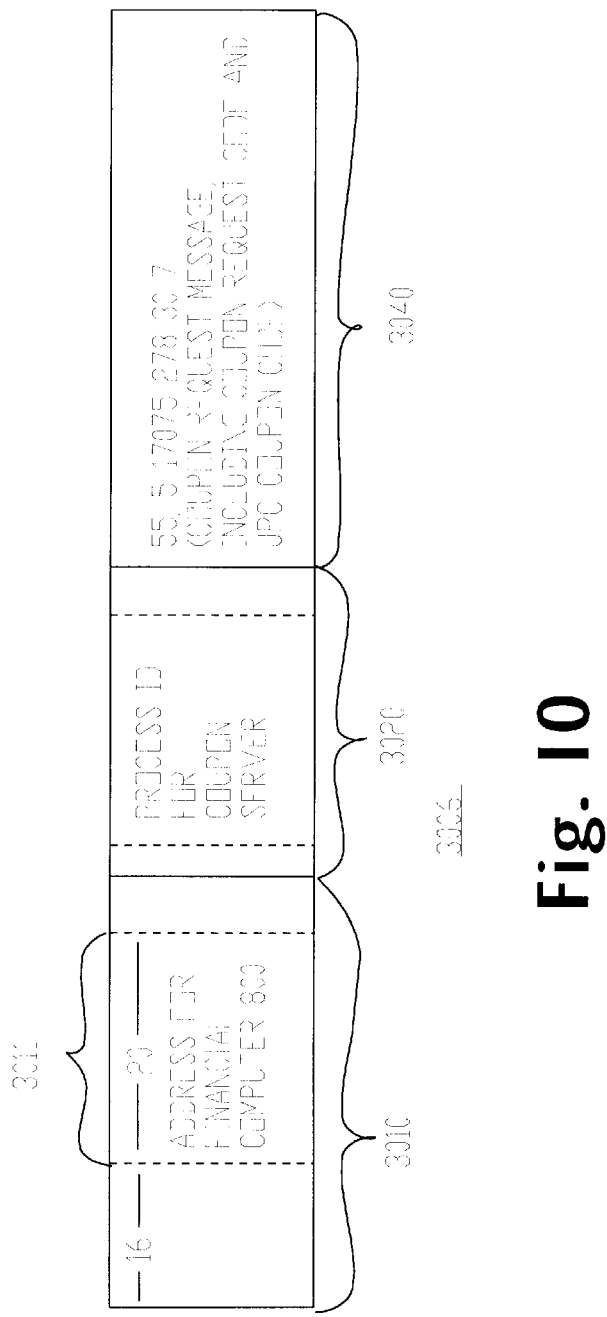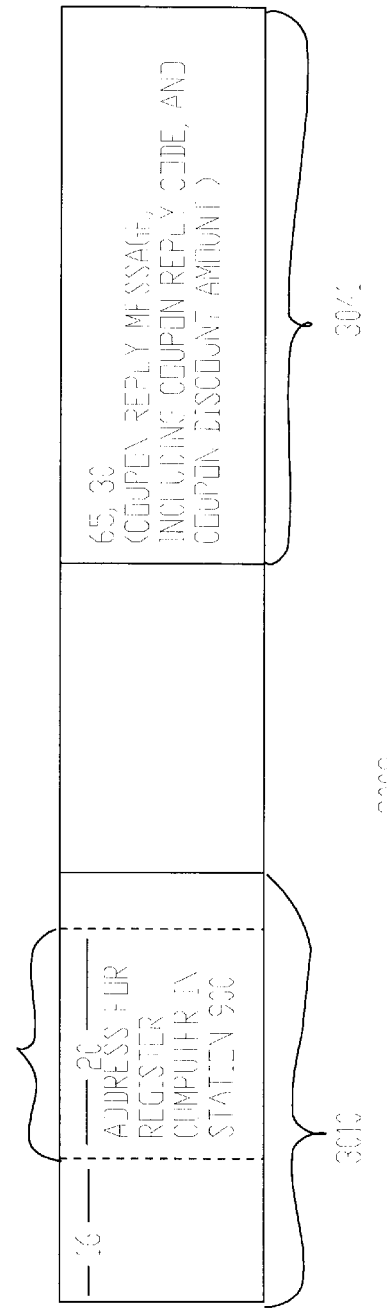

```
30:  5 17031 268 45 8
     5 17054 235 76 5
     5 17075 278 30 7
```

8435

RETAIL STORE AND METHOD EMPLOYING MULTIPLE NETWORK INTERFACES AT EACH CASH REGISTER, AND RECEIVING SIGNALS FROM PORTABLE CARDS AT EACH CASH REGISTER

BACKGROUND OF THE INVENTION

1. Field of the Invention

This invention relates generally to a retail system and, more particularly, to a computer network for compiling information in a retail system.

2. Description of Related Art

Discount coupons are a popular means to stimulate sales of products such as grocery store items. In 1992, approximately 310 billion coupons were distributed and 7.7 billion coupons were redeemed. It has been difficult, however, to monitor conventional coupon distribution and redemption schemes to provide information on program effectiveness and customer demographics.

SUMMARY OF THE INVENTION

It is an object of the present invention to provide a computer network for automatically compiling information in a retail system.

It is another object of the present invention to provide a computer network for processing transactions in a retail system, and to compile information on coupon program effectiveness and customer demographics.

To achieve these and other objects of the present invention, in a system including a plurality of products, plurality of coupons, a first program having a first address space, and a second program having an address space different that the first address space, a method of operating the system comprises the steps of processing a coupon to generate a first signal corresponding to a product, and a second signal corresponding to a person holding the coupon; sending the first signal to the first program; receiving a third signal corresponding to a product; determining a price by processing the first and third signals; and sending the first and second signals to the second program to determine marketing information.

According to another aspect of the present invention, a system comprises a plurality of products; a plurality of coupons; and a plurality of cash register stations, each station including a first program having a first address space, a second program having an address space different that the first address space, means for processing a coupon to generate a first signal corresponding to a product, and a second signal corresponding to a person holding the coupon, means for sending the first signal to the first program, means for receiving a third signal corresponding to a product, means for determining a price by processing the first and third signals, and means for sending the first and second signals to the second program to determine marketing information.

BRIEF DESCRIPTION OF THE DRAWINGS

FIG. 5A is a plan view of one of the customer cards shown in FIGS. 3A and 3B.

FIG. 5B is a side view of the card shown in FIG. 5A.

FIG. 5C is an enlarged, partial view of the card shown in FIG. 5A.

FIG. 10 is a diagram of a coupon request message, sent over the computer network from the check out station shown in FIGS. 2 and 6A to the financial computer shown in FIG. 2.

FIG. 11 is a diagram of a coupon reply message, sent over the computer network from the financial computer shown in FIG. 2 to the check out station shown in FIGS. 2 and 6A.

The accompanying drawings which are incorporated in and which constitute a part of this specification, illustrate embodiments of the invention and, together with the description, explain the principles of the invention, and additional advantages thereof. Throughout the drawings, corresponding elements are labeled with corresponding reference numbers.

DESCRIPTION OF THE PREFERRED EMBODIMENTS

First Preferred Embodiment

Figure 1:
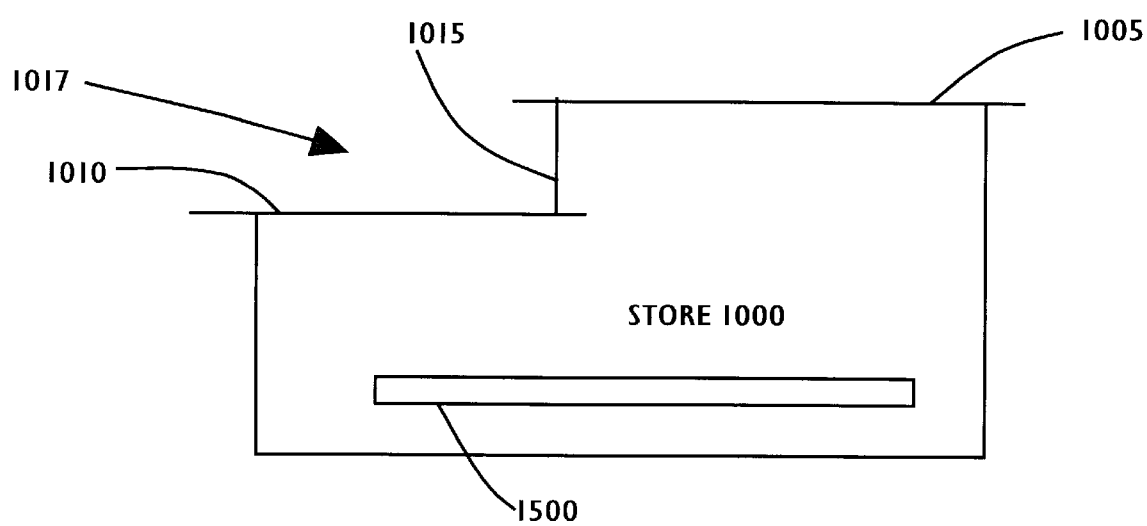
FIG. 1 is a schematic diagram of a retail system in accordance with a first preferred embodiment of the present invention.

FIG. 1 shows a store 1000 including roof structure 1017 and computer network 1500 under roof structure 1017, in accordance with a first preferred embodiment of the present invention. Roof structure 1017 includes roof section 1010, window 1015 coupled to roof section 1010, and roof section 1005 coupled to window 1015.

Figure 2:
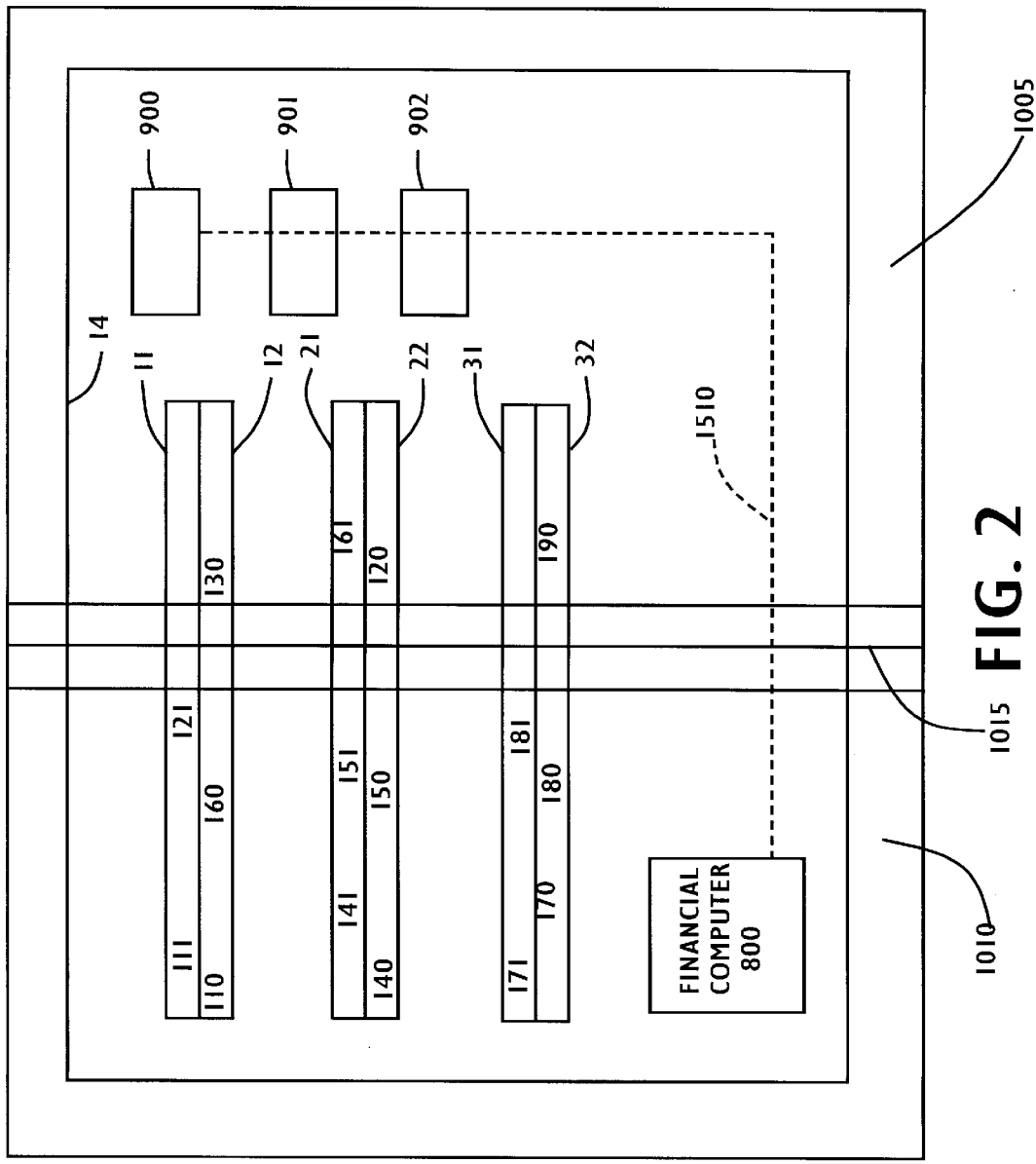
FIG. 2 is a plan view of a retail store in the first preferred system.

FIG. 2 shows a plan view of store 1000. Shelves 11, 12, 21, 22, 31, and 32 include product areas 111, 121, 110, 120, 130, 141, 151, 161, 140, 150, 160, 171, 181, 170, 180, and 190. Each product area includes a plurality of a respective product. Customers shop in store 1000, by removing products from the shelves and bringing the products to one of the checkout counter 900, 901, or 902. Computers in checkout stations 900, 901, 902 communicate with financial computer 800 via computer network cable 1510.

Figure 3A:
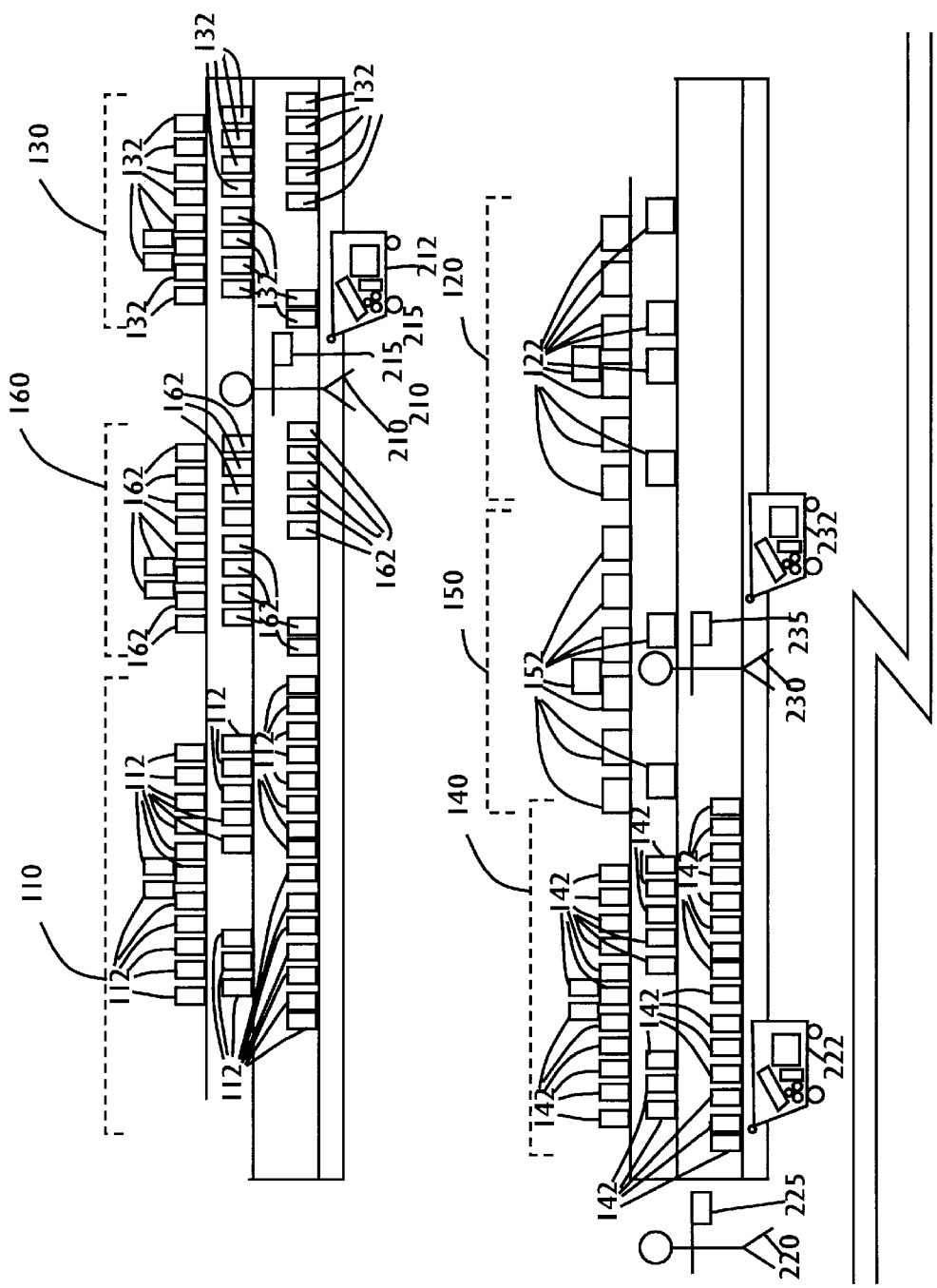
FIGS. 3A and 3B are another type of view of a part of the retail store.
Figure 3B:
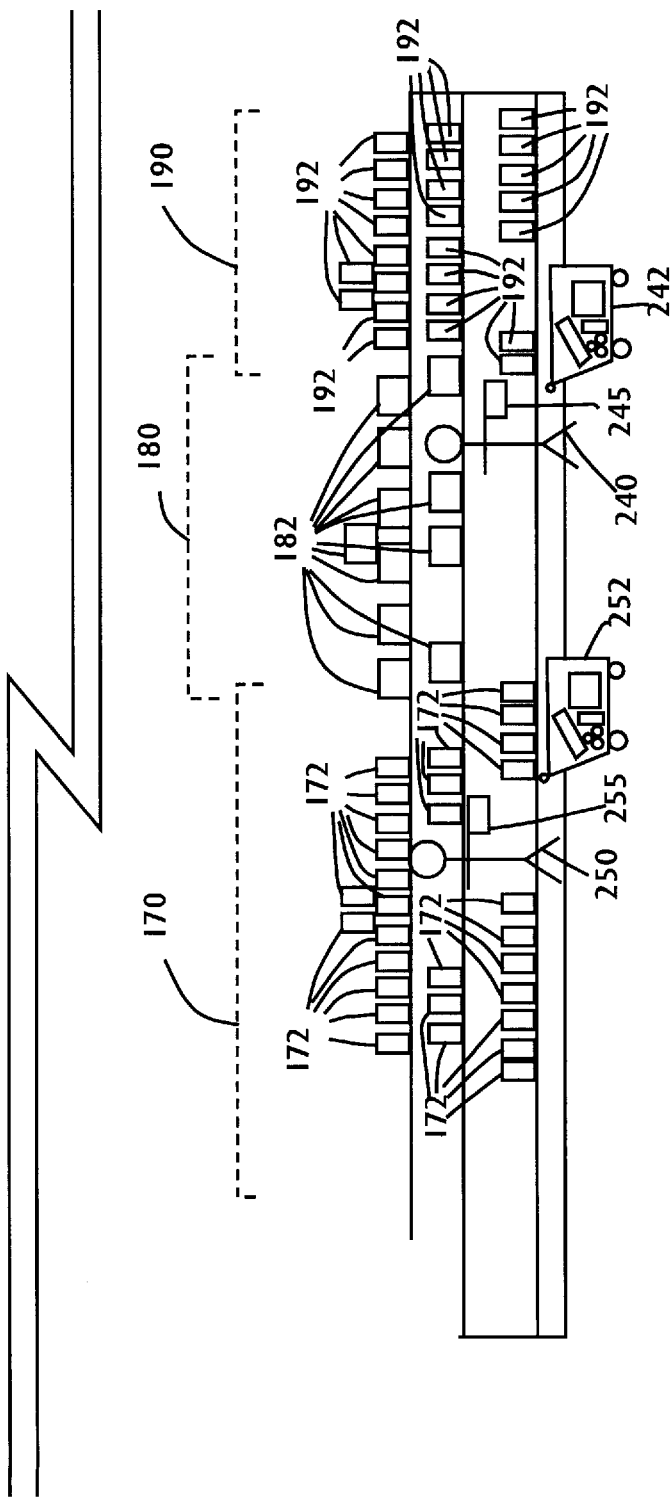

FIG. 3A and FIG. 3B are each a partial view of store 1000. Customers 210, 220, 230, 240, 250, 270, 280, and 290, shop in store 1000. Store 1000 has a plurality of product areas, each corresponding to a respective product. Product Area 110 has Acme brand ammonia. Product Area 120 has Old World brand pasta. Product Area 130 has Lighthouse brand light bulbs.

Figure 4A:
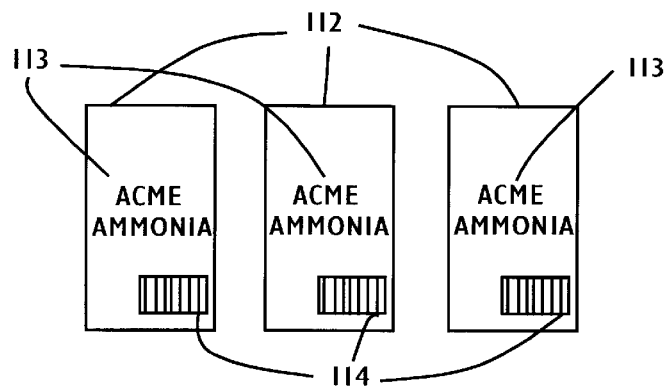
FIGS. 4A, 4B, and 4C are enlarged views of some products shown in FIGS. 3A and 3B.

Product area 110 has bottles of ammonia 112 contiguously grouped together on multiple shelves. Bottles of ammonia 112 are contiguously grouped, meaning that no other product is between any two bottles of ammonia 112. FIG. 4A shows an enlarged view of some of the bottles of ammonia 112. Each bottle of ammonia has a common Universal Product Code (UPC) symbol 114. Symbol 114 encodes a 12-digit number that is part of a product identification system documented by the Uniform Code Council, Inc., Dayton, Ohio. In UPC Product Code format, the first digit is a 0, designating a product. The next five digits are a manufacturer ID. The next 5 digits are an item number. The last digit is a check digit.

Each UPC symbol 114 is a group of parallel lines that encodes a number (0 17075 00003 3) that uniquely identifies acme ammonia. In other words, symbol 114 is different from UPC symbols of units of other products. Each bottle of ammonia 112 also has a common character label 113 that verbally describes the product. Character label 113 is "ACME AMMONIA." Label 113 is different from labels of units of other products.

Figure 4B:
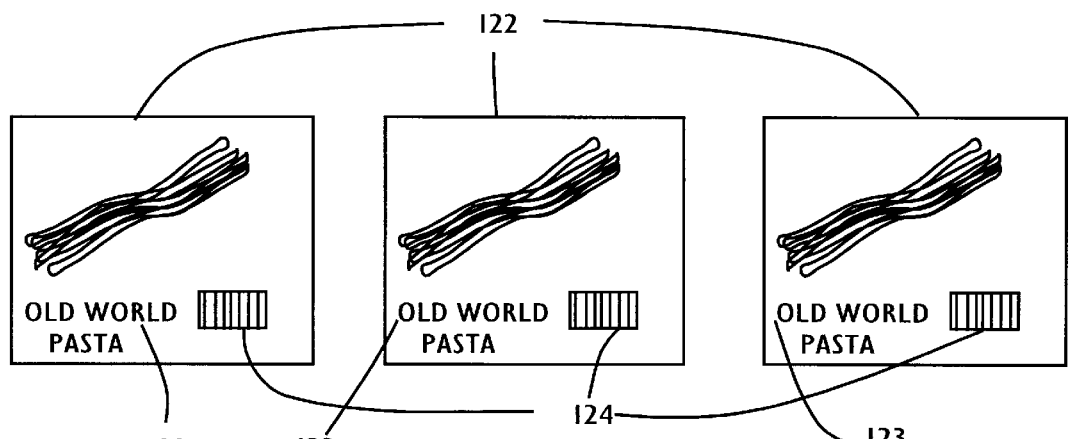

Product Area 120 has boxes of pasta 122 contiguously grouped together on multiple shelves. FIG. 4B shows an enlarged view of some of the boxes of pasta 122. Each box of pasta 122 has a common UPC symbol 124, which is a group of parallel lines that encodes a number (0 17031 00005 3) that uniquely identifies Old World pasta. In other words, symbol 124 is different from UPC symbols of units of other products. Each box of pasta 122 also has a common character label 123 that verbally describes the product. Character label 123 is "OLD WORLD PASTA." Label 123 is different from labels of units of other products.

Figure 4C:
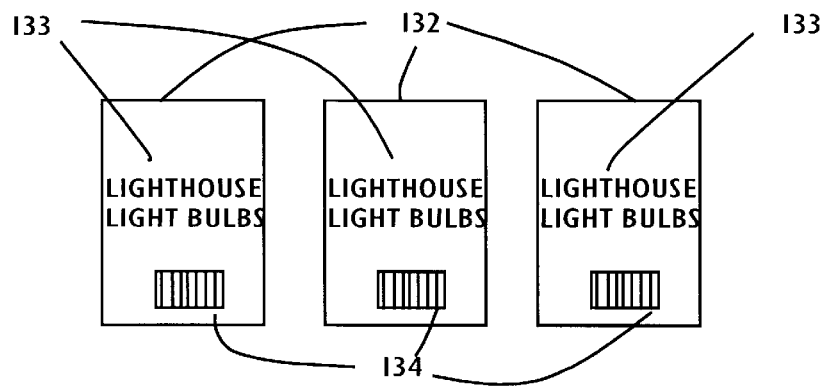

Product Area 130 has boxes of light bulbs 132 grouped together on multiple shelves. FIG. 4C shows an enlarged view of some of the boxes of light bulbs 132. Each box of light bulbs 132 has a common UPC symbol 134, which is a group of parallel lines that encode a number (0 17054 1017 6) that uniquely identifies Lighthouse light bulbs. In other words, symbol 134 is different from UPC symbols of other products. Each box 132 also has a common character label 133 that verbally describes the product. Character label 133 is "LIGHTHOUSE LIGHT BULBS." Label 133 is different from labels of other products.

Similarly, other product areas in store 1000 each have a set of respective products contiguously grouped together. Respective units of a certain product have a common UPC symbol, different from UPC symbols on units of other products, that uniquely identifies the certain product. Respective units of a certain product have a common label, different from labels on units of other products, that uniquely identifies the certain product. Product area 140 has bottles of ketchup 142 contiguously grouped together. Product area 160 has loaves of bread 162 contiguously grouped together. Product area 170 has cartons of milk 172 contiguously grouped together. Product area 180 has packages of bacon 182. Product area of 190 has packages of butter 192 contiguously grouped together. Product area 111 has boxes of paper towels contiguously grouped together. Product area 121 has rolls of paper towel contiguously grouped together. Product area 141 has boxes of crackers contiguously grouped together. Product area 151 has canned fruit contiguously grouped together. Product area 161 has canned vegetables contiguously grouped together. Product area 171 has cans of meat contiguously grouped together. Product area 181 has boxes of flour contiguously grouped together.

FIG. 5A shows a plan view of customer card 215 carried by customers 210, and FIG. 5B shows a side view of card 215. Card 215 is 8.5 cm by 5.4 cm, the length and width of a typical financial credit card. Card 215 is slightly thicker than a typical financial credit card. Card 215 includes a magnetic stripe 2410, interface contacts 2420 for communication with the checkout station, and embossed area 2430 for displaying the card owner's name. Magnetic stripe 2410 allows a conventional credit card stripe reader to read basic data from the card. Magnetic stripe 2410 is not necessary to the operation of the preferred embodiment of the invention, described in more detail below.

FIG. 5C shows interface contacts 2420 in more detail. Interface contacts 2420 are configured in accordance with ISO 7816-2: 1988(E), Identification cards—Integrated circuit (s) cards with contact—Part 2: Dimensions and locations of the contacts, promulgated by the International Organization for Standardization (ISO), and available from the American National Standards Institute (ANSI), 11 West 42nd Street, New York, N.Y. 10036. According to ISO 7816-2, contact 2421 is assigned to VCC (supply voltage), contact 2422 is assigned to RST (reset signal), contact 2423 is assigned to CLK (clock signal), contact 2424 is reserved for future use, contact 2425 is assigned to GND (ground), contact 2426 is assigned to VPP (program and voltage), contact 2427 is assigned to I/O (data input/output), and contact 2428 is reserved for future use. Card 215 communicates with the checkout stations through contact 2427 using a half duplex scheme, meaning that contact 2427 is for communicating data signals either to or from the card.

Figure 6A:
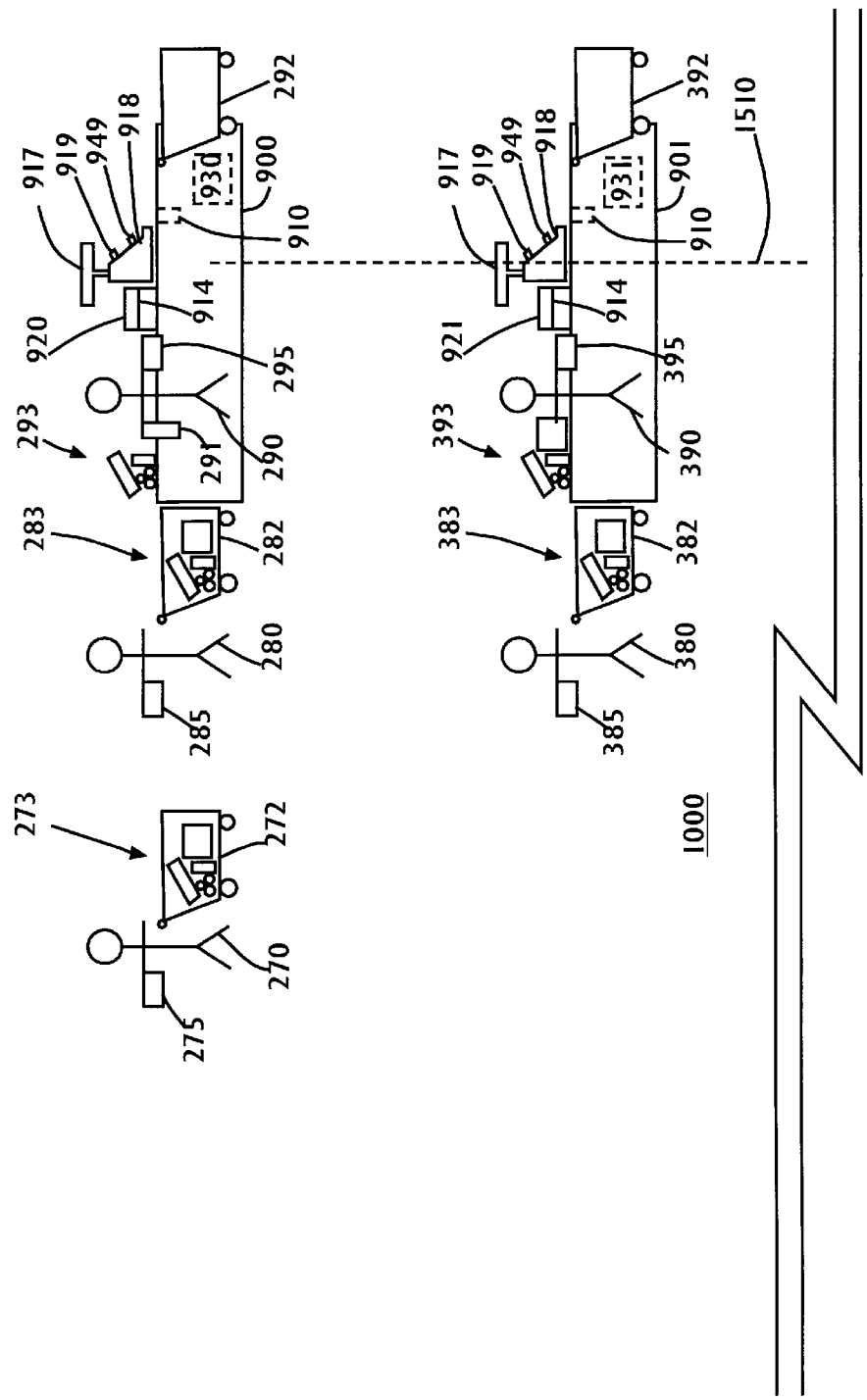
FIGS. 6A and 6B are the other type of view of another part of the retail store.
Figure 6B:
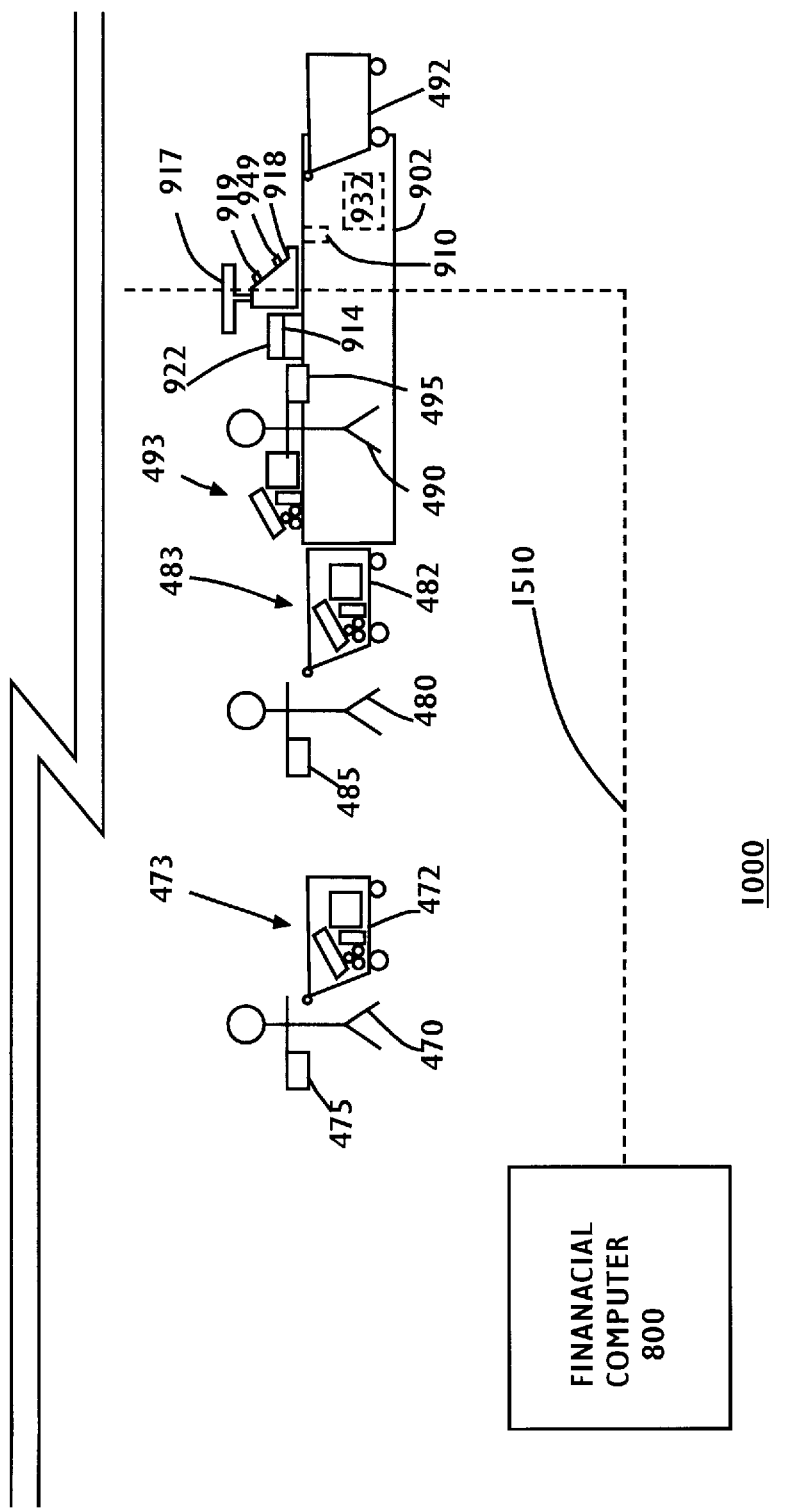

FIGS. 6A and 6B show another part of store 1000, including checkout stations 900, 901, and 902. Each checkout station includes a UPC bar code reader that detects an optical (electromagnetic) signal reflected from a UPC symbol. Each checkout station also includes a card interface computer 920 having a card interface slot 914.

Figure 7:
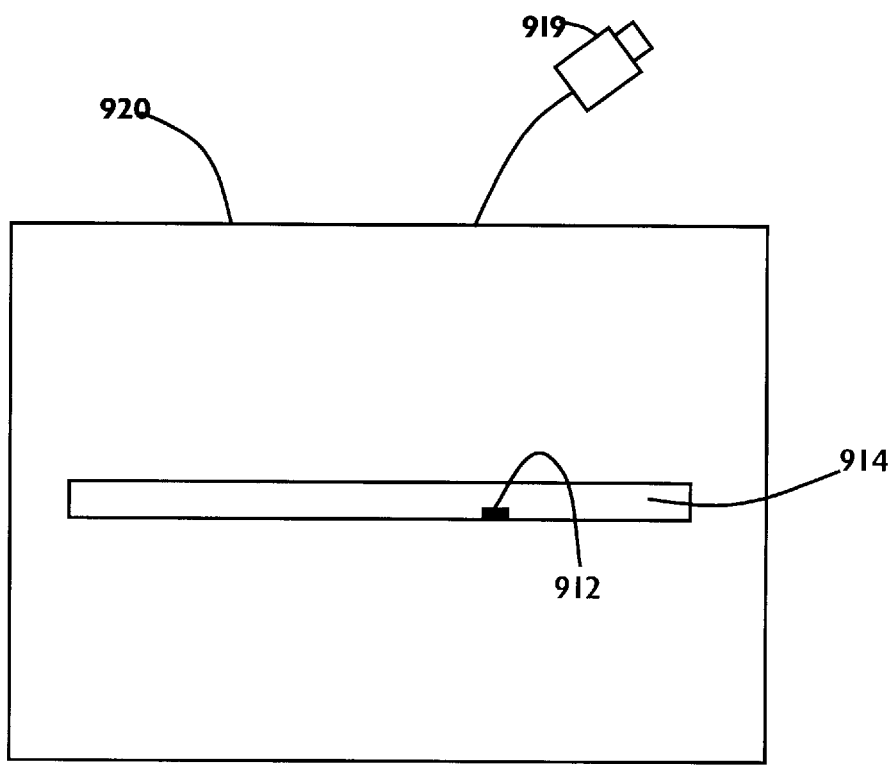
FIG. 7 is a drawing of the card interface shown in FIG. 6A.

FIG. 7 shows the housing of card interface computer 920 in more detail. Interface slot 914 has a width sufficient to accommodate the width of one of the customer cards. When a customer card is in interface slot 914, conductive contact 912 inside interface slot 914 touches contact 2427 (shown in FIG. 5C) on a customer card. Interface slot 914 has other contacts (not shown) for touching the other card contacts 2420 (shown in FIG. 5C), thereby applying power from the interface to the card.

An overview of processing performed by the customers and circuitry of the first preferred system will now be described.

Before shopping in the store, each of these customers obtained a customer card. For example, customer 230 obtained customer card 235 from a bank, by completing an application. The application contained questions to collect demographic data, including birth date, income level, past buying patterns, geographic location, size of family, level of education, and job-related data. The bank subsequently wrote customer identification data for customer 230 onto customer card 235, and issued customer card 235 to customer 230, and sent the customer's demographic data to marketing research center 13100 (see FIG. 13) which then stored the demographic data on a magnetic disk in center 13100. Each of customers 210, 220, 240, 250, 270, 280, and 290 obtained a respective customer card in a similar manner.

A customer may start shopping with a card already loaded with electronic coupons. For example, the store may preload new cards as an incentive for completing and submitting a check cashing application. The customer may also have a device at home for loading coupons onto the card, as described in Applicant's copending U.S. patent application of KEN R. POWELL for SYSTEM AND METHOD FOR DISTRIBUTING COUPONS THROUGH A SYSTEM OF COMPUTER NETWORKS, Ser. No. 08/603,482, filed Feb. 20, 1996, the contents of which is herein incorporated by reference. The customer may also load coupons onto the card while shopping in the store, as described in Applicant's copending U.S. patent application of KEN R. POWELL for RETAIL SYSTEM, Ser. No. 08/468,816, filed Jun. 6, 1995, the contents of which is herein incorporated by reference.

While shopping in store 1000, each of customers 210, 220, 230, 240, 250, 270, 280, and 290 carries his or her respective customer card. Customer 210 carries card 215, customer 220 carries card 225, customer 230 carries card 235, customer 240 carries card 245, customer 250 carries card 255, customer 270 carries card 275, customer 280 carries card 285, and customer 290 carries card 295. Each customer tows a shopping cart to hold selected products. Customer 210 tows cart 212, customer 220 tows cart 222, customer 230 tow cart 232, customer 240 tows cart 242, customer 250 tows cart 252, customer 270 tows cart 272, customer 280 tows cart 282, and customer 290 tows care 292. Each customer removes one or more desired products from a shelf and places the removed product into her cart.

Upon completion of shopping, the customer brings selected products from the shelves to checkout counter 900, 901, or 902. The customer redeems the electronic coupons by inserting her customer card into card interface 915. For example, a customer such as customer 290 in FIG. 6A completes the purchase of her selected products 293 by transferring products 293 from her cart 292 to counter 900, and by inserting card 295 into card interface slot 914. Subsequently, a checkout clerk (not shown) scans each selected product past bar code reader 910.

After coupon redemption data, including customer identification data from a plurality of cards, is compiled and sent to a marketing research center, as described below, the research center uses the customer identification data to access the corresponding demographic data, thereby providing manufacturers with marketing data on coupon program effectiveness and customer demographics.

Figure 8:
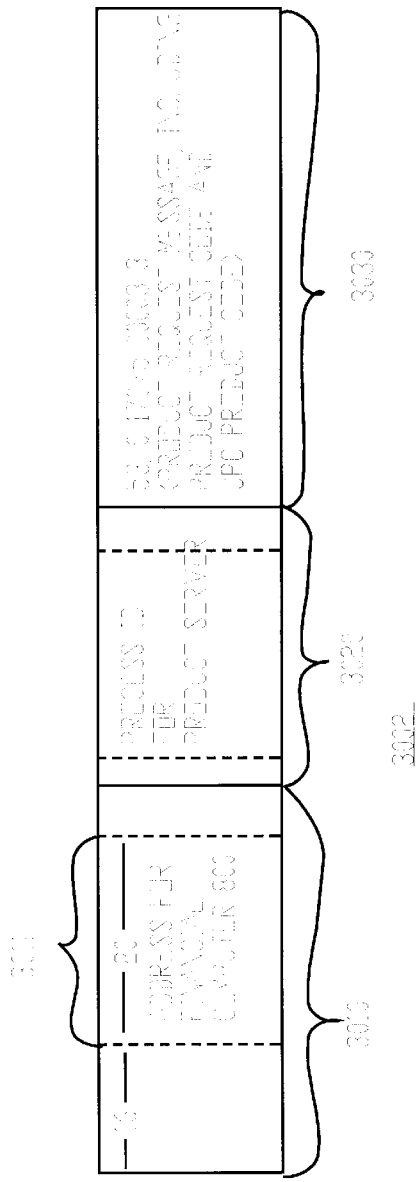
FIG. 8 is a diagram of a product request message, sent over the computer network from the check out station shown in FIGS. 2 and 6A to the financial computer shown in FIG. 2.

FIG. 8 shows a message 3002 sent by checkout station 900 to financial computer 800, via network cable 1510, in response to receiving a product signal from bar code reader 910. Message 3002 is a request for product information for the most recently scanned product 293.

Figure 9:
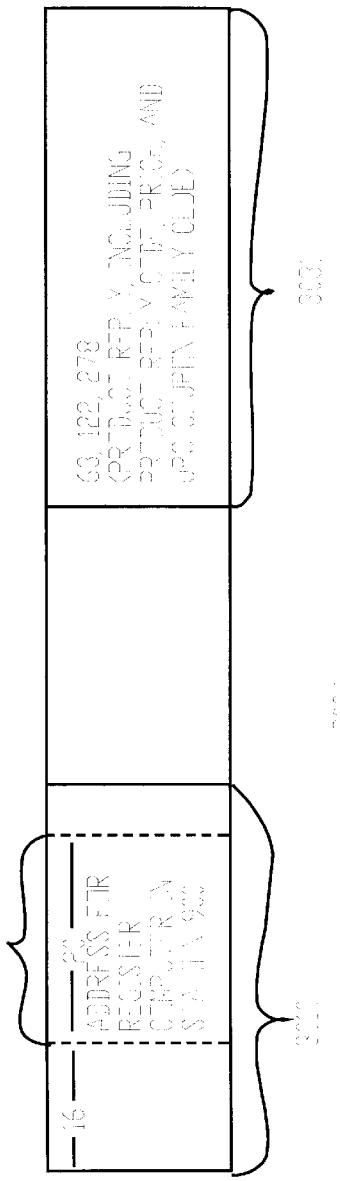
FIG. 9 is a diagram of a product reply message, sent over the computer network from the financial computer shown in FIG. 2 to the check out station shown in FIGS. 2 and 6A.

FIG. 9 shows a message 3004 sent from financial computer 800 to checkout station 900, via network cable 1510. Financial computer 800 sends a message 3004 in response to receiving a message 3002.

After station 900 determines a price for the product by processing a message 3004, station 900 displays the price on display 917. Thus, station 900 acts to detect a product scanned by bar code reader 910 and determine a price for the product by sending a message 3002 to financial computer 800 and receiving a message 3004 from financial computer 800. Checkout counter 900 scans and processes each product 293 in a similar manner.

Station 900 then receives any coupons being redeemed by customer 290. Station 900 may receive a paper coupon, such as paper coupon 291 held by customer 290, by presenting the paper coupon to bar code reader 910. In other words, checkout station 900 may process paper coupon 291 (a substrate encoding a coupon) by detecting light, using bar-code-reader 910, reflected from the paper substrate and generating a signal in accordance with this detected signal.

Checkout station 900 may also receive a coupon from card 295 held by customer 290, via card interface computer 920.

FIG. 10 shows a message 3006 sent from checkout station 900 to financial computer 800 via network cable 1510 in response to receiving a coupon signal, from either bar code reader 910 or card interface computer 920.

FIG. 11 shows a message 3008 sent from financial computer 800 to checkout station 900, via network cable 1510. Financial computer 800 sends a message 3008 in response to receiving a message 3006.

Checkout station 900 processes discount reply messages 3008 to deduct discounts from the purchase price and determine a total price. Station 900 displays the total price on display 917, to complete the checkout transaction for customer 290.

Figure 12:
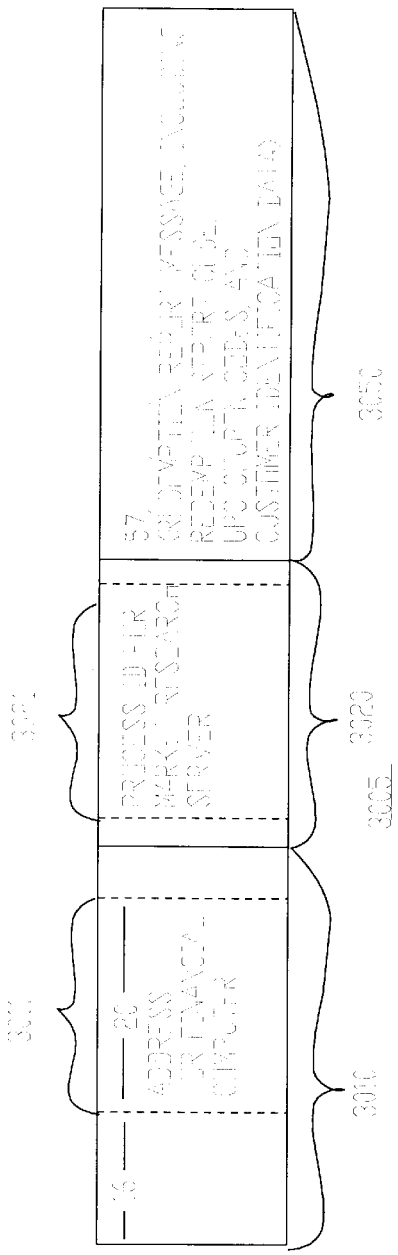
FIG. 12 is a diagram of a redemption report message, sent over the computer network from the check out station shown in FIGS. 2 and 6A to the financial computer shown in FIG. 2.

FIG. 12 shows a message 3005 sent by checkout station 900, via network cable 1510, to financial computer 800. Message 3005 includes an identification code for customer 290 and information about the coupon redemptions for the checkout transaction.

Similarly, customer 390 in FIG. 6A will complete the purchase of her selected products 393 by transferring products 393 from her cart 392 to station 901, and by inserting card 395 into interface slot 914 of station 901; and the checkout clerk (not shown) will scan each selected product 393 past UPC bar code reader 910. Customer 490 in FIG. 6B will complete the purchase of his selected products 493 by transferring products 493 from his cart 422 to station 902, and by inserting card 495 into interface slot 914 of station 902; and the checkout clerk (not shown) will scan each selected product 493 past UPC bar code reader 910 of station 902.

The preferred system and method will now be described in more detail.

Figure 13:
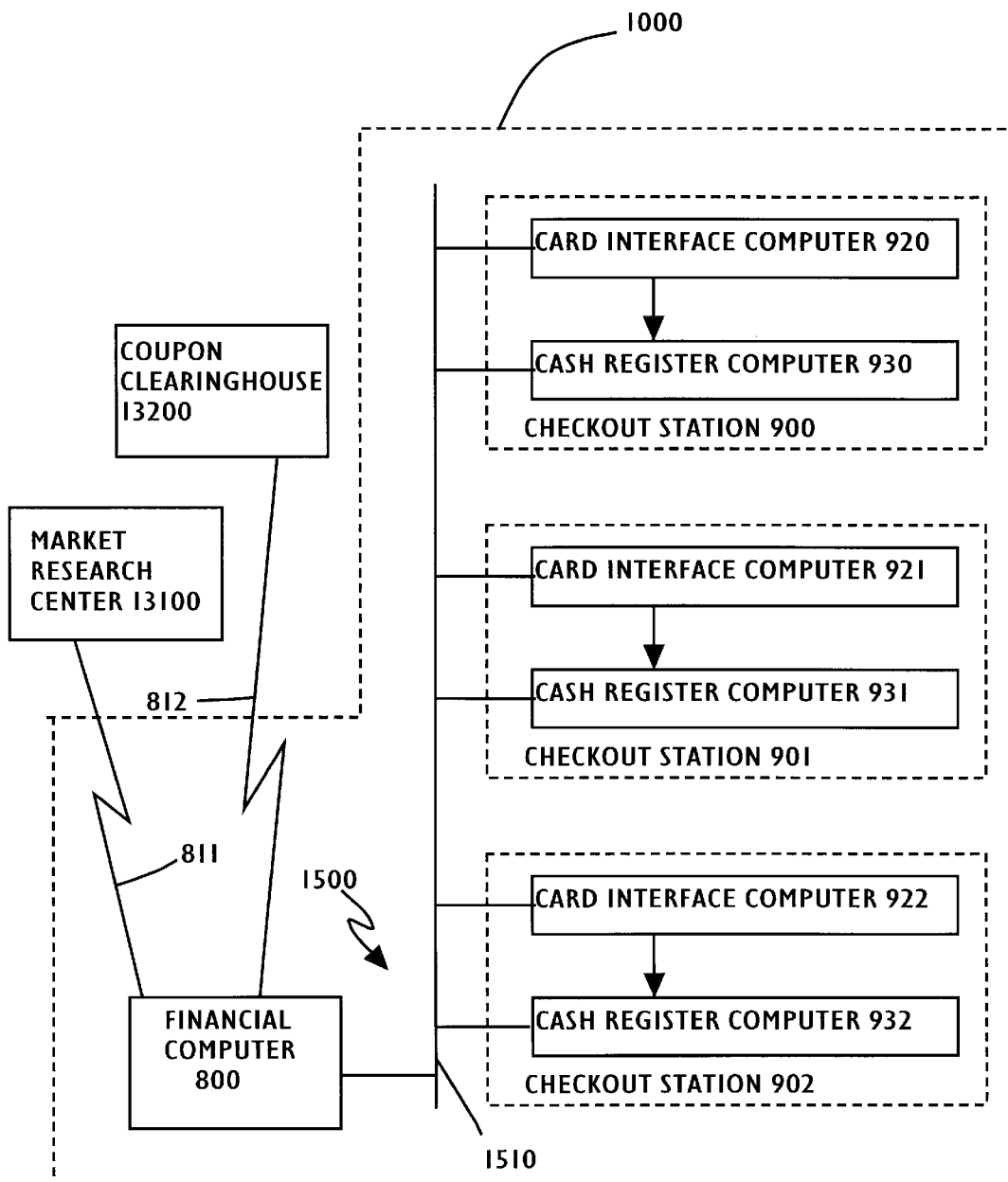
FIG. 13 is a block diagram of the first preferred computer network.

FIG. 13 shows another aspect of the first preferred system. Market research center 13 100 and coupon clearinghouse 13200 are located outside of store 1000. Local Area Network (LAN) 1500 in store 1000 includes cable 1510 and 7 computers: financial computer 800, card interface computer 920, cash register computer 930, smart card computer 921, cash register computer 931, smart card computer 922, and cash register computer 932. Card interface computer 920 and cash register computer 930 are in checkout station 900, card interface 921 and cash register computer 931 are in checkout station 901, and card interface computer 922 and cash register computer 932 are in checkout station 902. Each of computers 800, 920, 930, 921, 931, 922, and 932 has a respective network address uniquely identifying the computer in network 1500. Each of computers 800, 920, 930, 921, 931, 922, and 932 has a respective network interface card for recognizing when a packet containing the computer's address is sent over cable 1510, temporarily storing such a packet, and alerting the computer's CPU when such a packet is recognized.

These computers communicate with each other by sending data packets in a format conforming to the communication protocol of network 1500, meaning, for example, that the packet has a destination address field offset a certain number of bits from the start of the packet, and that the destination address field has a certain number of bits. Each packet is essentially a type of signal.

In FIG. 8, header 3010 of message 3002 includes a 20 bit destination address field 3011 identifying financial computer 800 on network 1500. Destination address field 3011 is 16-bits removed from the beginning of the data package 3002. Header 3010 contains other fields, including a field containing the address of the sender of packet 3002, and a field containing data correction bits. Field 3020 contains an identification code for a certain process executing on financial computer 800, as discussed in more detail below. Field 3030 includes the number 53, which is a code indicating that information for a product is being requested. Following the product request code 53 is a UPC product code identifying the product. Message 3002 is a request for information about Acme Ammonia, because the UPC product code is 0 17075 00003 3.

In FIG. 9, header 3010 of message 3004 includes a 20-bit destination address field 3011 identifying the cash register computer in check out station 900. Field 3031 includes the number 63, which is a code indicating a reply to a product request message. Following the reply code 63 is the price of the product (122) in cents, and the three-digit UPC coupon family code (278) assigned to the product.

In FIG. 10, header 3010 of message 3006 includes destination address field 3011 identifying financial computer 800. Field 3020 contains an identification code for another process executing on financial computer 800. Field 3040 includes the number 55, which is a code indicating that information for a UPC coupon code is being requested. Following the discount request code 55 is a UPC coupon code.

In FIG. 11, header 3011 of message 3008 includes a destination address field 3011 identifying the register computer in station 900. Field 3041 includes the number 65, which is a code indicating that this message is a reply to a discount request message. Following the code 65 is the value of the coupon in cents, which in this case is thirty cents.

Figure 14:
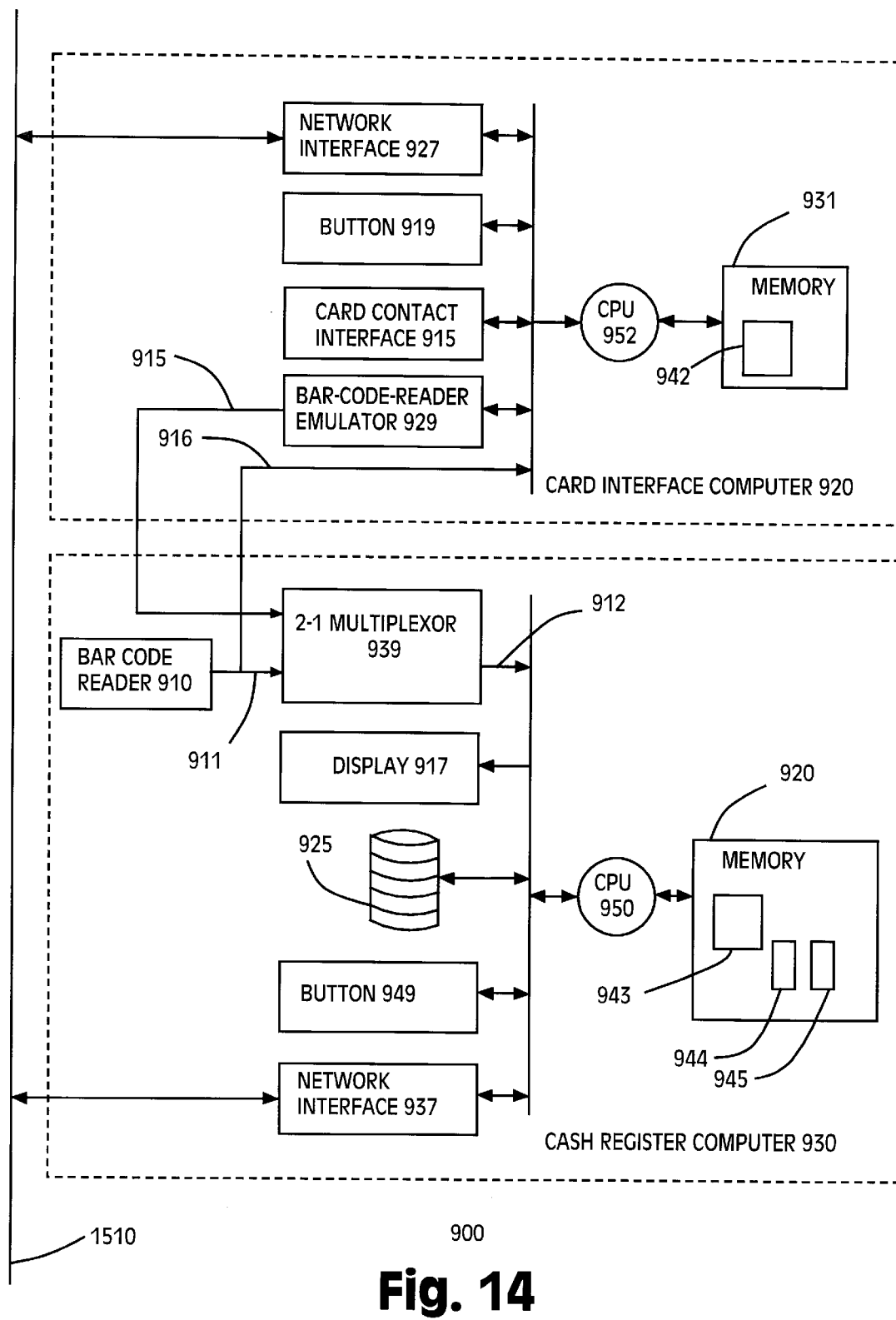
FIG. 14 is a block diagram of a check-out station shown in FIG. 6A.

FIG. 14 is a block diagram of checkout station 900 including cash register computer 930 and card interface computer 920. In cash register computer 930, disk 925 provides long term storage. CPU 950 executes instructions in random access, addressable memory 923. CPU 950 receives a bar code signal through 2-1 multiplexor 939. The bar code signal may originate from bar code reader 910 or from card interface computer 920, as discussed in more detail below.

By UPC convention, a bar code having a first digit equal to 5 is a bar code for a coupon. Thus, if the first digit of the bar code signal from multiplexor 939 is a 5, CPU 950 sends a message 3006 to financial computer 800. Otherwise, if the first digit is not 5, CPU 950 sends a message 3002 to financial computer 800.

In card interface computer 920, CPU 952 executes program 942 in memory 933. CPU 952 and program 942 act to receive an electronic coupon from a smart card, via contact interface 915, and send bar code data to bar-code-reader emulator 929.

Optical bar-code reader 910 sends a bar code signal to CPU 950 via cable 911. Bar-code reader 910 sends the signal, on cable 911, in RS-232/serial interface format. Bar-code-reader emulator 929 also sends a signal, via cable 918, in RS-232/serial interface format. 2-1 multiplexor 939 receives the signal on either cable 911 or cable 918, and relays the signal to CPU 950 via cable 912. Multiplexor 939 relays the signal, on cable 912, in RS-232/serial interface format. Thus, a conventional supermarket checkout counter, that would normally have a direct serial interface to an optical bar-code reader, may be augmented with card interface computer 920 and 2-1 multiplexer 939 to practice the preferred embodiments of the invention, without requiring a change to the software of the conventional checkout counter.

Bar-code reader 910 also sends data to CPU 952 via cable 916. The bar-code signal sent to CPU 952, via cable 916, is identical to the bar-code signal sent to CPU 950, via cable 911. Cable 916 does not interfere with the normal signal path between bar-code reader 910 and CPU 950. Any control signals sent to bar-code reader 910 originate at cash register computer 930; card interface computer 920 merely passively monitors the bar-code signal generated by bar code reader 910.

Checkout stations 901 and 902 each have the same circuitry as checkout station 900, described above, except that computer 921 has a respective network interface card for recognizing the network address of computer 921, computer 931 has a respective network interface card for recognizing the network address of computer 931, computer 922 has a respective network interface card for recognizing the network address of computer 922, computer 932 has a respective network interface card for recognizing the network address of computer 932.

Figure 15:
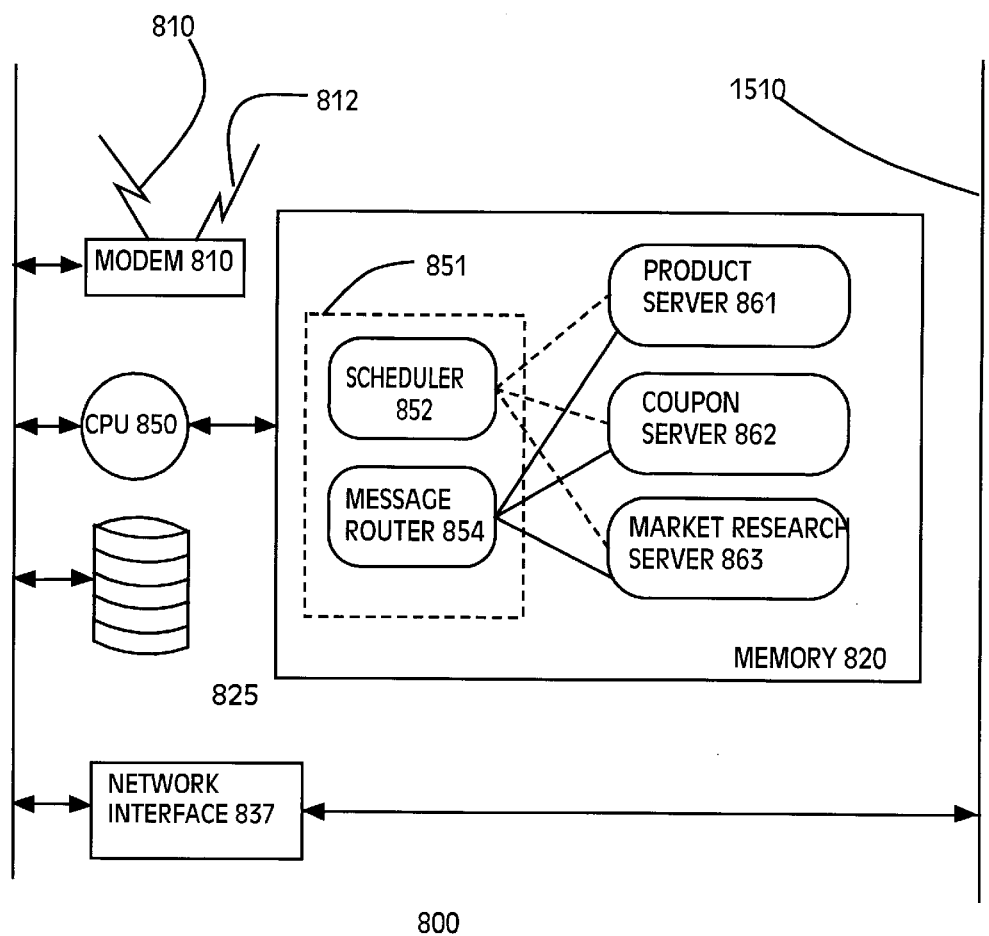
FIG. 15 is a block diagram of the in-store financial computer shown in FIG. 2.

FIG. 15 shows a block diagram of financial computer 800. CPU 850 executes operating system 851 and application processes 861, 862, and 863. CPU 850 executes scheduler 852 in operating system 851 to run one of processes 861, 862, or 863 at a particular time. Each of servers 861, 862, and 863 runs in its own address space, meaning that a certain address in one of the servers accesses a different memory location than the same address in another one of the servers. Various parts of the components shown in random access memory 820 may be transferred between memory 820 and disk memory 825 using a virtual memory mapping scheme, as is well known in the art.

CPU 850 sends and receives messages through network cable 1510 and network interface card 837. Message router 854 reads message field 3020 and gives the message to the application process identified in field 3020. In response, an application process can cause a message to be sent over network interface card 837 and cable 1510.

Product server 861 includes a table for translating a UPC product code into a three-digit UPC coupon family ID code, and another table for translating a UPC product code into a retail price for the product.

Coupon server 862 includes a table for translating the two-digit value code field, in a UPC coupon code, into a value amount. Periodically, coupon server 862 sends a redemption report signal to electronic clearing house 13200, via modem 810 and telephone signal path 812. The redemption report signal sent to the clearing house 13200 includes the identification of store 1000, identification of the coupons redeemed and of respective quantities of coupon redemptions.

Periodically, market research server 863 sends another kind of redemption report signal to market research center 13100, via modem 810 and telephone signal path 811. The redemption report signal sent to research center 13100 includes the identification of the store 1000, identification of the customers who redeemed electronic coupons, and identification of the coupons redeemed. The format of the redemption report signal sent from server 863 to research center 13100 is shown in Table 1, below.

TABLE 1

| | |
|---|---|
| [store ID for store 1000] | |
| [customer ID 317] | [UPC code 1] |
| [customer ID 53] | [UPC code 2] |
| [customer ID 3] | [UPC code 3] |
| [customer ID 17] | [UPC code 4] |
| [household ID 11] | [UPC code 5] |
| [household ID 2] | [UPC code 6] |
| . | . |
| . | . |
| [customer ID n] | [UPC code] |
| [household ID m] | [UPC code n + m] |

Each row in table 1 records a redemption transaction. Each customer ID number is a copy of data 8467 from a customer card, and the corresponding UPC code is from list 8435 from one of the customer cards. Each household ID is from a UCC/EAN-128 coupon extended code on a paper coupon, and the corresponding UPC code is from the paper coupon.

Research center 13100 includes a magnetic disk memory for storing demographic data records. Each record is indexed by customer ID or household ID. As shown in Table 2, below, each row represents a demographic record for a customer. The first entity in each row is the record key, or index. The second entity is date of birth, and the third entity is yearly income.

TABLE 2

| | | |
|---|---|---|
| [customer ID 1] | March 12, 1944 | 30,100 |
| [customer ID 2] | March 12, 1964 | 23,700 |
| [customer ID 3] | March 12, 1932 | 30,100 |
| [customer ID 4] | March 12, 1905 | 89,000 |
| [customer ID x] | January 3, 1947 | 28,100 |
| [household ID 1] | February 2, 1952 | 17,300 |
| [household ID 2] | March 12, 1940 | 85,000 |
| [household ID 3] | July 3, 1907 | 42,000 |
| . | . | . |
| [household ID y] | December 12, 1975 | 19,100 |

Research center 13100 processes report signals, such as the block shown in Table 1, and uses the IDs in the signal blocks to access demographic records, such as the record shown in Table 2. Center 13100 then generates a report summarizing certain trends, such as the report shown in Table 3, below, and prints the report on paper.

TABLE 3

ACME AMMONIA COUPON REDEMPTIONS FOR MARCH 1995

| AGE RANGE | TOTAL BOTTLES SOLD WITH COUPON |
|---|---|
| 15–25 | 60,456 (30%) |
| 25–40 | 102,345 (51%) |
| 40–60 | 14,345 (7%) |
| over 60 | 23,456 (12%) |
| all ages | 200,602 (100%) |

In other words, the preferred system performs a method of determining retail buying patterns. The method writes demographic data, obtained from a customer application questionnaires described above into the magnetic disk memory in market research center 13100. The method writes personal identification data 8467 onto customer cards, or household ID data onto a coupon containing the coupon extended code. Center 13100 generates the report by accessing the demographic data, using identification signals 8467 from customer cards or household ID data from coupon extended codes, to generate a demographic signal; and by correlating the demographic signal (indicating age) with the second signal (purchases of ammonia).

Figures 16, 17:
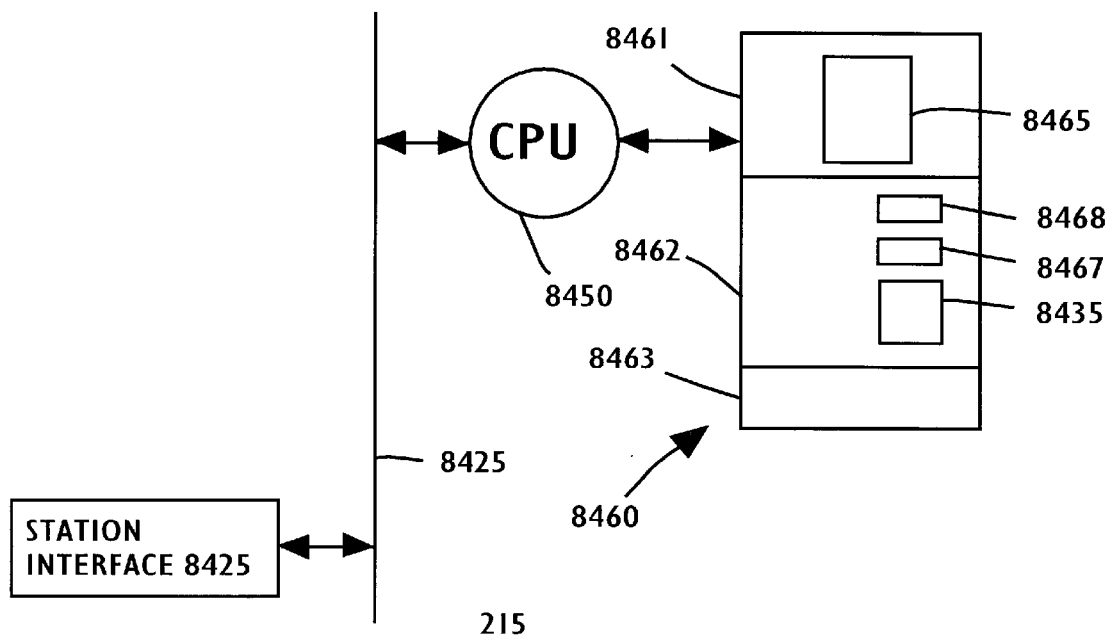
FIG. 16 is a block diagram of a customer card.
FIG. 17 is a diagram of some memory contents of a customer card.

FIG. 16 is a block diagram of customer card 215, including central processing unit 8450, processor 8450, and memory 8460. Random access memory 8460, includes three addressable segments: nonvolatile read only memory (ROM) 8461; nonvolatile, electrically erasable memory (EEPROM) 8462; and memory 8463 for temporary storage. Station interface 8425 includes a serial to parallel converter for transferring data signals between contact 8427 and CPU 8450 over parallel bus 8452. ROM 8461 stores a program 8465 executed by processor 8450. EEPROM 8462 stores customer identification data 8467, and authorization data 8468. Customer identification data 8467 includes a sequence of digits that uniquely identifies the holder of the card. Customer identification data 8467 includes the card holder's social security number. For example, identification data 8467 in customer card 235 uniquely identifies customer 230. Authorization data 8468 may include a sequence of digits that includes a code identifying the store or stores in which the card may be used to obtain a paperless coupon. Authorization data 8468 may also include date data indicating an expiration date for the card. Depending on the card holder's contractual relationship with the card issuer, the card issuer may periodically update this date data to renew the card when the current date data indicates the card is expired. Store authorization data 8468 also contains a field identifying that the card is a customer card.

EEPROM 8462 also stores product data received from one or more coupon dispensing devices. This product data includes a list of product discounts 8435. When a customer inserts a customer card into a coupon dispensing device, processor 8450 receives a coupon code for the product from the device and adds the code to the list.

FIG. 17 shows some the contents list 8435 starting at offset 30 of EEPROM 8462 of customer card 215. An electronic coupon is a 12-digit number in UPC Coupon Code format. In this format, the first digit is a 5, designating a coupon. The next five digits are a manufacturer ID. The next 3 digits are a family code. The next 2 digits are a value code. The last digit is a check digit. In FIG. 17, the customer card is storing three electronic coupons, reflecting the fact that customer 210 has received electronic coupons from coupon dispensing devices. In list 8435, the memory field having the number 5 17031 268 45 8 corresponds to a coupon for purchase of a box of Old World Pasta 124. The memory field having the number 5 17054 235 76 5 corresponds to a coupon for purchase of a box of Lighthouse Light Bulbs 134. The memory field having the number 5 17075 278 30 7 corresponds to a coupon for purchase of bottle of ammonia bottles 112.

Each of the customer cards has the same hardware structure as customer card 215.

Figure 18A:
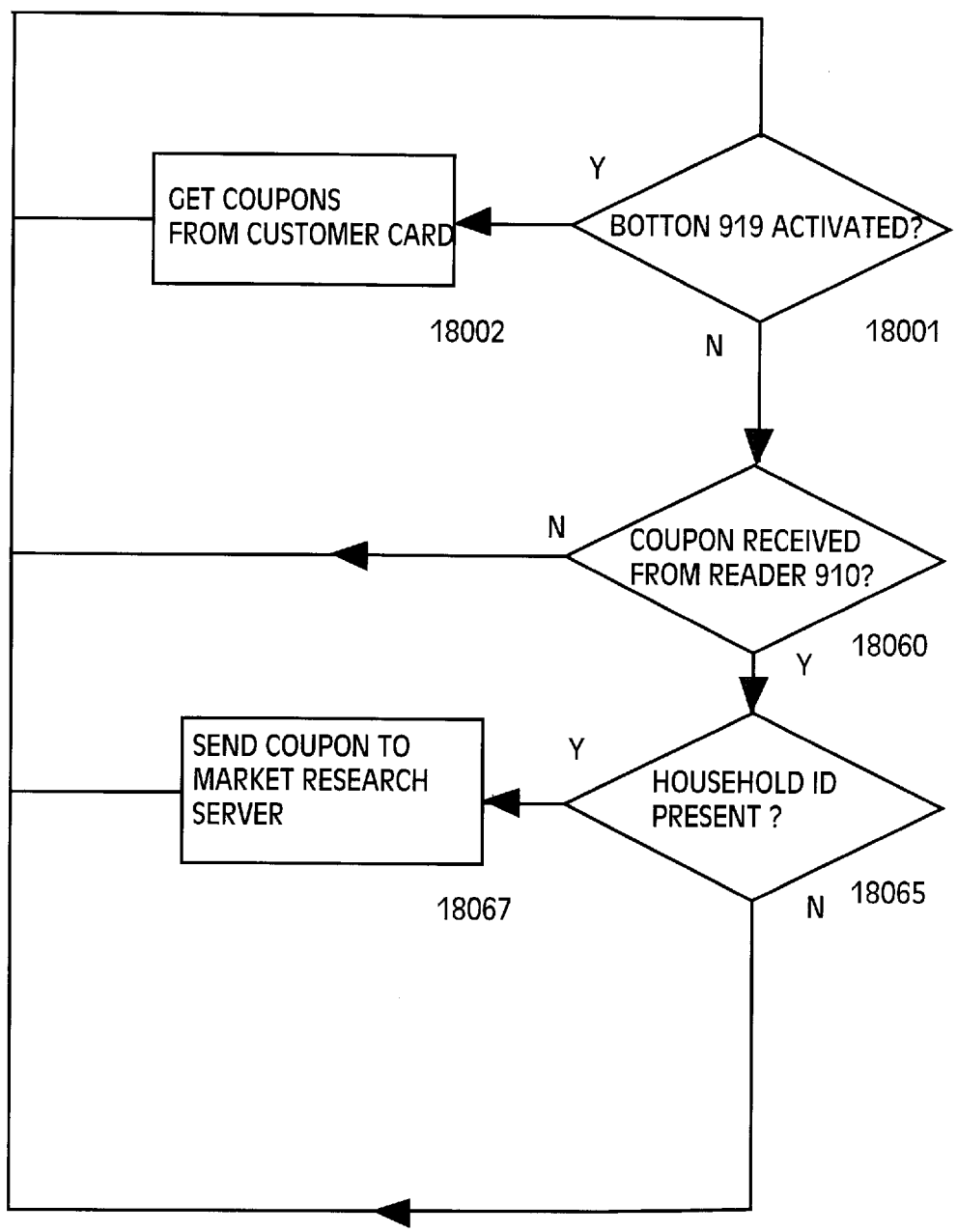
FIGS. 18A and 18B are a flow chart of a processing performed by a part of the check-out station.

FIG. 18A shows a processing performed by card interface computer 920. If the checkout clerk activates button 919 (Step 18001), card interface computer 920 gets electronic coupons from a customer card in interface slot 914 and sends the coupons to cash register computer 930 (Step 18002). If a bar-code having an initial digit of 5, indicating a coupon, is received via cable 916 from bar-code reader 910 (Step 18060), CPU 952 determines whether a household ID is present in the coupon bar-code symbol (Step 18065). In step 18065, CPU 952 determines if the bar-code symbol encodes a household ID, after the 12-digit coupon ID, by looking for the numbers 8100 and 21 (which are "application identifiers" indicating that the symbol encodes an 8-digit household ID, as explained more fully in the UPC Coupon Code Guidelines Manual, cited supra). If the household ID is present, CPU 952 sends the coupon to the market research server via cable 1510 (step 18067).

Figure 18B:
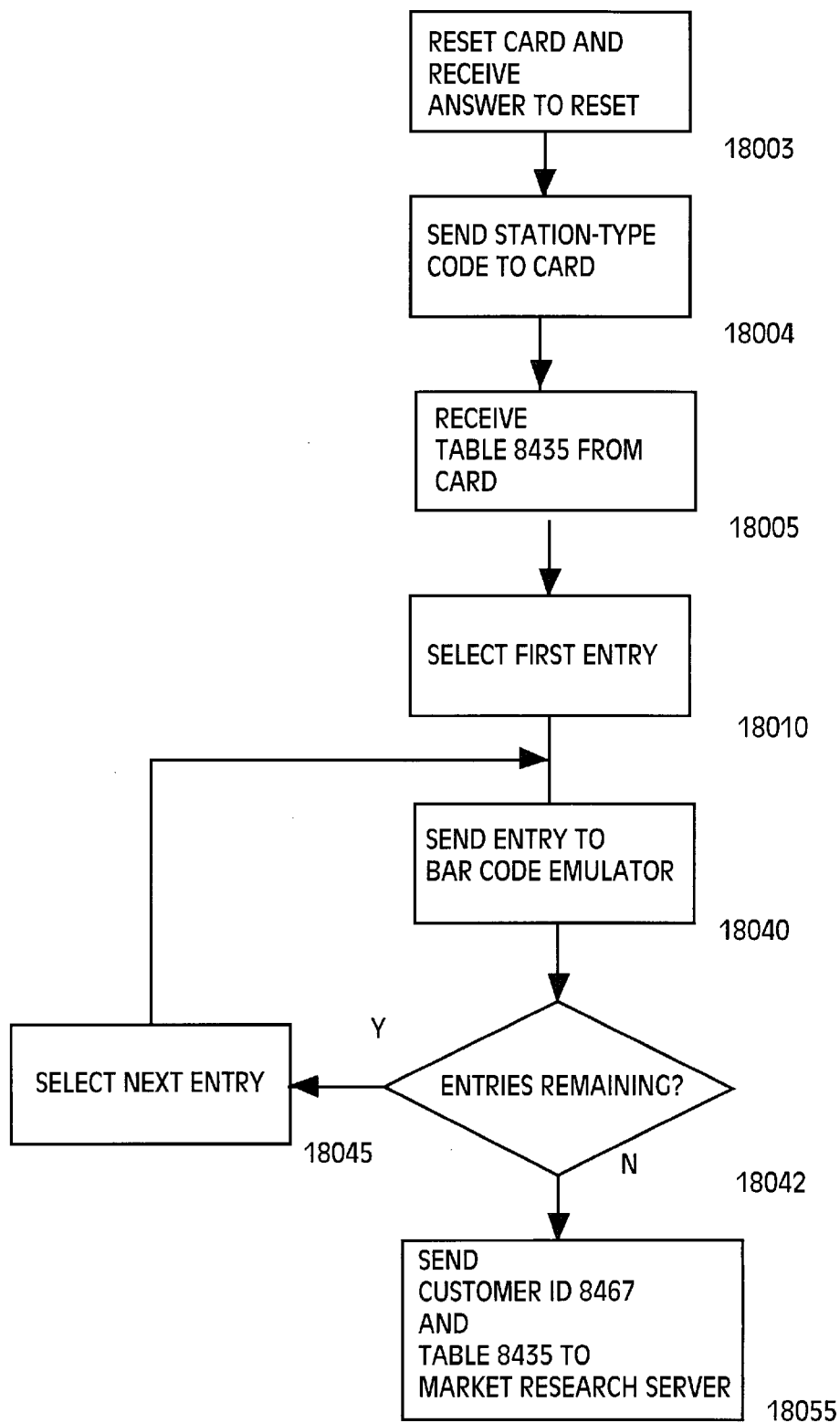

FIG. 18B shows step 18002 of FIG. 18A in more detail. CPU 950 communicates with a card in interface slot 914 through card contact interface 915. A switch (not shown) in interface slot 917 alerts interface 915, which alerts CPU 952, that a card has been inserted into the slot. Subsequently, CPU 952 causes card contact interface 915 to reset the card by applying a clock signal to card contact 2423. The card then answers the reset by sending a block of data, including identification data 8467 and authorization data 8468, through card contact 7427. CPU 952 then receives the answer-to-reset block, via contact interface 915, from the card, and temporarily stores the answer-to-reset block in memory 933 (step 18003).

CPU 952 then sends a data block containing a station-type code indicating a checkout station (step 18004). CPU 952 then receives the contents of table 8435 in EEPROM 8462 of the customer card, and temporarily stores these table 8435 contents in memory 933 (step 18005). CPU 952 selects the first entry of table 8435 from memory 933 (step 18010).

CPU 952 sends the presently selected entry to bar-code-reader emulator. (Step 18040). Bar-code-reader emulator 929 translates data received from CPU 952 into a signal emulating the format of the signal generated by bar code reader 910, and sends this signal to 2-1 multiplexer 939. This emulation allows CPU 950 in cash register computer 930 to receive a code, via 2-1 multiplexer 939, using the same processing used for optical bar code reading.

If there are entries remaining (step 18042), CPU 952 selects the next entry in table 8435 (step 18045) and processing proceeds to step 18040. If there are no entries remaining, CPU 952 sends a redemption report message 3005 to market research server 863 on financial computer 800. This redemption report message 3005 includes the customer identification data 8467 (received in step 18002) and the coupon table 8435 (received in step 18005).

The communication protocol between CPU 925 and a customer card is described in more detail in ISO/IEC 7816-3: 1989 (E), Identification cards—Integrated circuit(s) cards with contacts—Part 3: Electronic signals and transmission protocols; and ISO/IEC 7816-3: 1989/Amd. 1: 1992 (E), Part 3: Electronic signals and transmission protocols, AMENDMENT 1: Protocol type T=1, synchronous half duplex block transmission protocol. Both of these standards are promulgated by the International Organization for Standardization (ISO) and distributed by the American National Standards Institute (ANSI).

Figure 19:
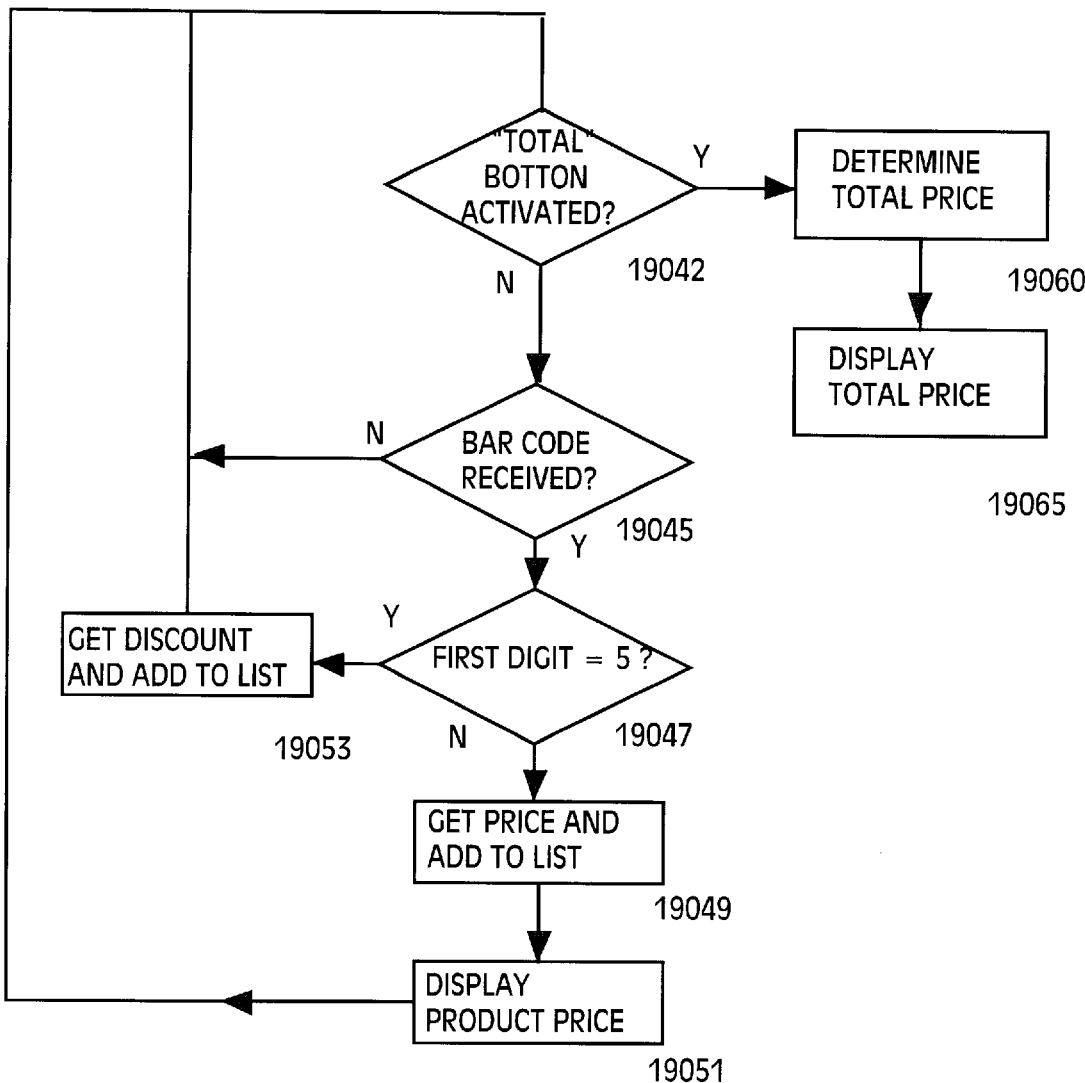
FIG. 19 is a flow chart of a processing performed by another part of the checkout station.

FIG. 19 shows a processing performed by CPU 950 and program 943 in cash register computer 930, when a customer checks out of store 1000. CPU 950 polls the TOTAL button 949 to see whether the checkout clerk has indicated that the checkout transaction is complete for the current customer (step 19042). When the checkout clerk (not shown) moves a product past UPC reader 910, UPC reader 910 detects the bar code on the product and sends the bar code to CPU 950. CPU 950 checks whether a bar code has been received (step 19045). If a bar code has been received and the first digit is a 5 (step 19047), CPU 950 sends a message 3006 (see FIG. 10) and receives a message 3008 (see FIG. 11) to get the discount corresponding to the bar code. CPU 950 then makes a record including the coupon and the discount amount, and adds this record to a temporary coupon list 944 in memory 923 (step 19053). If the first digit is not a 5, CPU 950 sends a message 3002 (see FIG. 8) and receives a message 3004 (see FIG. 9) to get the price of the product, and the UPC coupon family code of the product. (step 19049). CPU 950 then displays the price of the product on display 917 (step 19051). CPU 950 then makes a record including the product code, the product price, and the UPC coupon family code, and adds this record to a temporary product list 945 in memory 923.

When the checkout clerk activates the TOTAL button (step 19042), CPU 950 determines the total price for checkout transaction by subtracting any coupon discounts from the corresponding product price (step 19060). More specially, in step 19065 CPU 950 processes each entry in product list 945. If a product in list 945 has a corresponding coupon in list 944, CPU 950 subtracts the coupon's discount value from the product price and deletes the coupon from list 944. In other words, for each product in list 945, CPU 950 searches coupon list 944 for a corresponding coupon. A product corresponds to a coupon if the five-digit manufacturer ID in the UPC coupon code equals the five-digit manufacturer ID in the UPC coupon code, and the three-digit coupon family code for the product (received in message 3004) corresponds to the three-digit family code of the coupon. These two family codes correspond if they are equal or if the coupon family code is a summary code that matches certain digits of the product's coupon family code, as described more fully in the UPC Coupon Code Guidelines Manual, reprinted October 1994, from the Uniform Code Council, Inc., Dayton, Ohio. Thus, CPU 950 determines a total price for the checkout transaction. (step 19060). CPU 950 then displays the resulting total price on display 917 (step 19065).

Thus, card interface computer 920 processes a coupon (ID data 8467 and table 8435) to generate a first signal (a UPC coupon code having a manufacturers ID and family code) corresponding to a product, and a second signal (a customer ID) corresponding to a person holding the coupon (holding the customer card). Card contact interface 915 and CPU 952 send the first signal to program 943, via bar-code-reader emulator 929, cable 918, and 2-1 multiplexer 939. Card contact interface 915 sends the first and second signals to program 942 to determine marketing information.

Program 943, in cash register computer 930, receives a third signal, from bar-code-reader 910, corresponding to a product. Subsequently, program 943 determines a price by processing the first and third signals.

Similarly, cash register computer 930 processes a coupon to generate a first signal (the manufacturers ID and family code) corresponding to a product, and a second signal (the household ID) corresponding to a person holding the coupon. Bar-code-reader 910 sends the first signal to program 943 by way of cable 911, 2-1 multiplexer 939, and cable 912. Bar-code-reader 910 sends the first and seconds signals to program 942 by way of cable 916.

Figure 20:
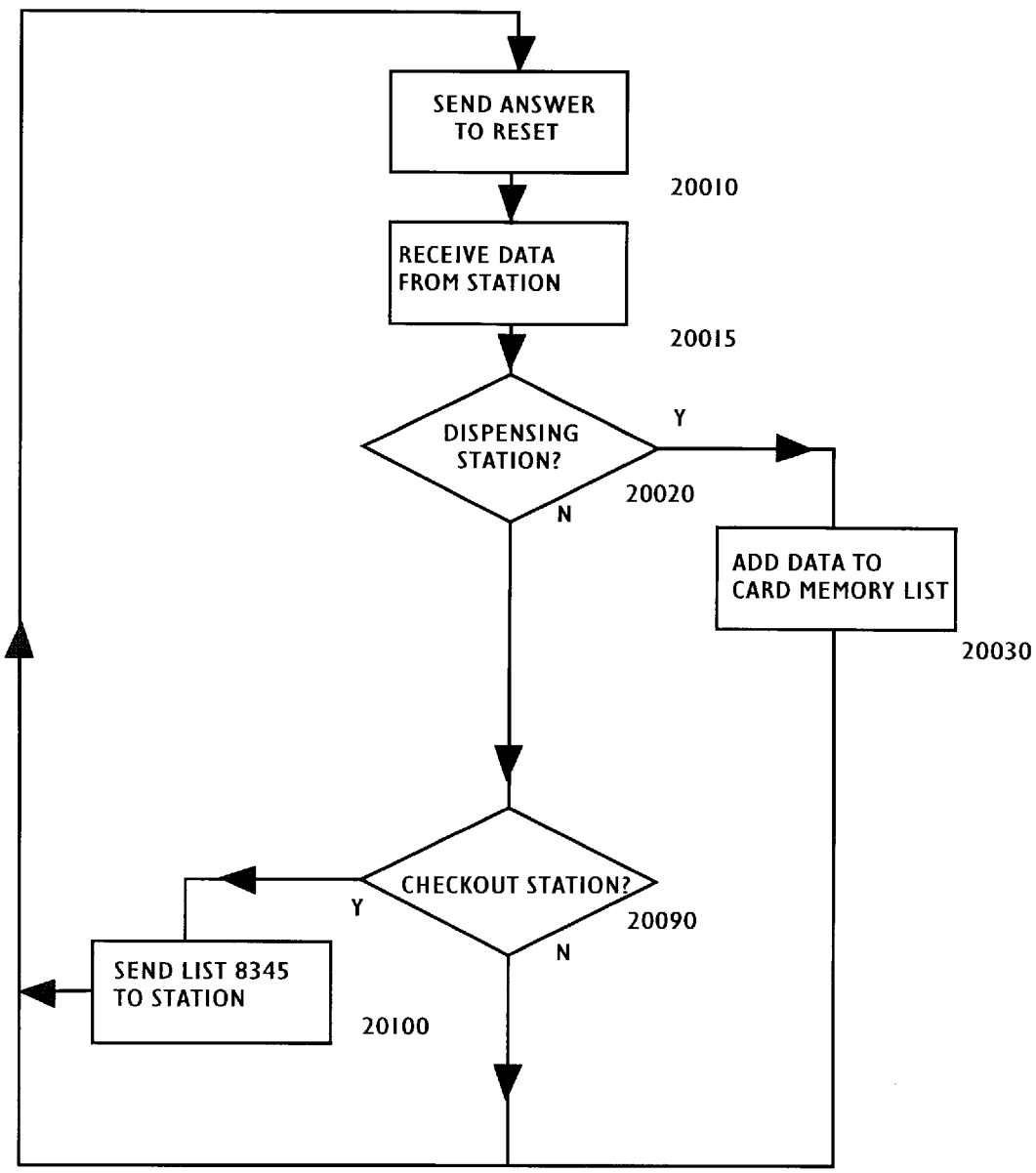
FIG. 20 is a flow chart of a processing performed by a customer card.

FIG. 20 shows a processing performed by one of the customer cards, such as customer card 215, in the preferred retail system. After the card is reset through contacts 2420, the customer card sends an "answer to reset" data block in accordance with the ISO standard ISO/ICE 7816-3: 1989 (E), cited above. The customer card sends identification data 2467 and authorization data 2468 in the answer-to-reset data block (step 20010). If the station then sends a block of data to the customer card, the customer card then receives the block of data through contact 2427 (step 20015). If the block contains a station-type code indicating a coupon dispensing device (step 20020), the customer card then adds product coupon information, from a certain offset in the block, to the list 8345 (step 20030).

If the customer card is not eligible, the station will not send a block of data, step 20015 therefore does not execute, and processing ceases until the customer card is reinserted into a station, at which time the station will reset the card and processing will restart at step 20010.

Alternatively, if the block contains a station-type code indicating a checkout station (step 20090), the customer card then sends list 8345 to the CPU 925 (step 20100). In other words, CPU 2450 reads list 8435 from memory 2460, in response to a customer inserting card 215 into interface slot 914, and sends a signal corresponding to the list 8345 to the checkout station (step 20100). Step 20100 also deletes lists 8435 from memory 2460, thereby preventing multiple redemptions of a single coupon.

Although the processing of step 20100 unconditionally deletes each coupon in lists 8435, alternative systems may selectively redeem and selectively delete coupons from the customer card. One such alternative system includes a hardware in computer 920 for displaying the coupons on a customer card and allowing the user to select certain displayed coupons for redemption. Under this scheme, only the selected coupons are sent to register computer 930 and only the selected coupons are deleted from list 8435.

In another alternative system, the card interface computer 920 could monitor the messages sent, over LAN cable 1510 by cash register computer 930, to detect the product request messages 3002 sent by cash register computer 930. Thus, card interface computer 920 could detect which products are purchased and only send coupons from list 8435 corresponding to purchased products, and only delete coupons from list 8435 corresponding to purchased products.

Second Preferred Embodiment

Figure 21:
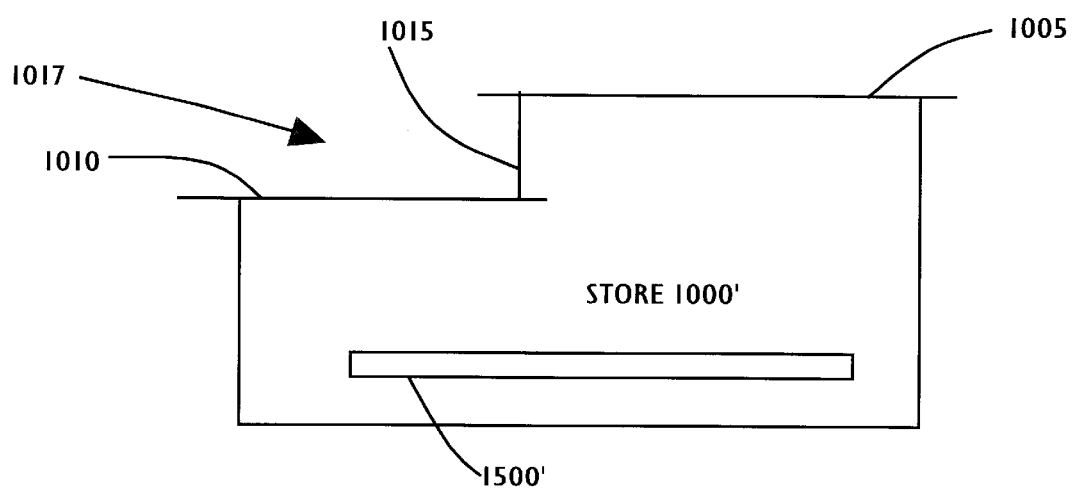
FIG. 21 is a schematic diagram of a retail system in accordance with a second preferred embodiment of the present invention.

FIG. 21 shows a store 1000' in accordance with a second preferred embodiment of the present invention. Store 1000' includes roof structure 1017 and computer network 1500' under roof structure 1017.

Figure 22:
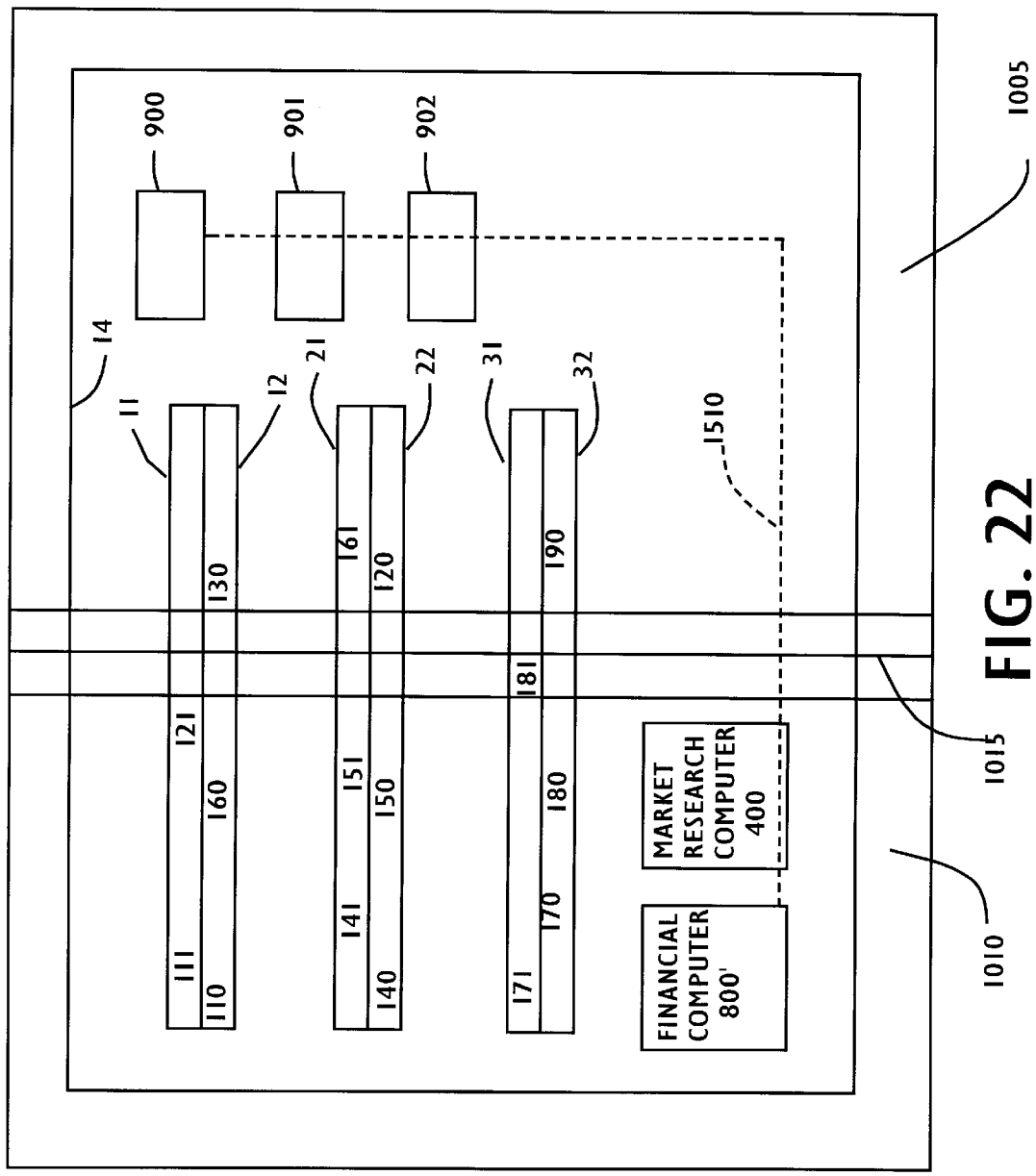
FIG. 22 is a plan view of a retail store in the second preferred system.

FIG. 22 is a plan view of store 1000'. Checkout counters 900', 901', 902' communicate with financial computer 800 via network cable 1510. Checkout counter 900', 901', and 902' also communicate with market research computer 400 via network cable 1510.

Figure 23:
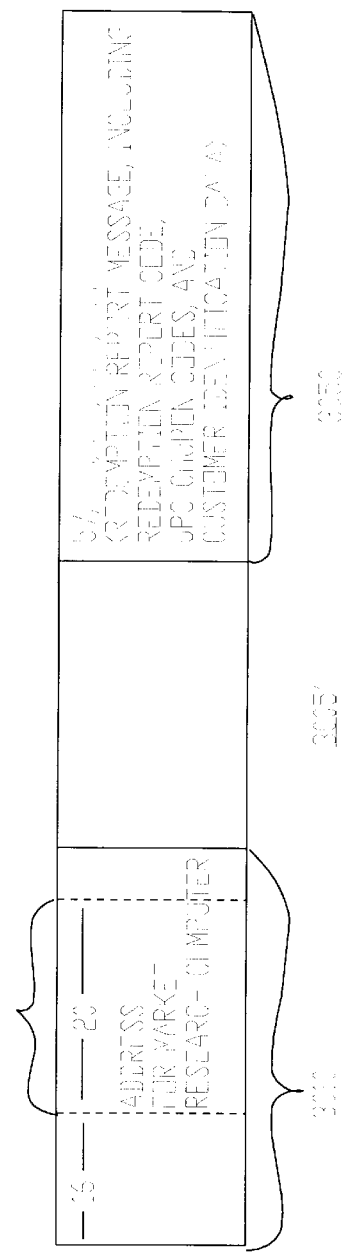
FIG. 23 is a diagram of a redemption report message, sent over the computer network from a checkout station to the market research computer shown in FIG. 22.

FIG. 23 shows a message 3005' sent by checkout station 900' to market research computer 400. Message 3005' includes destination field 3011 containing the network address for market research computer 400. Message 3005' also includes an identification of the customer and information about the coupon redemptions for the checkout transaction.

Figure 24:
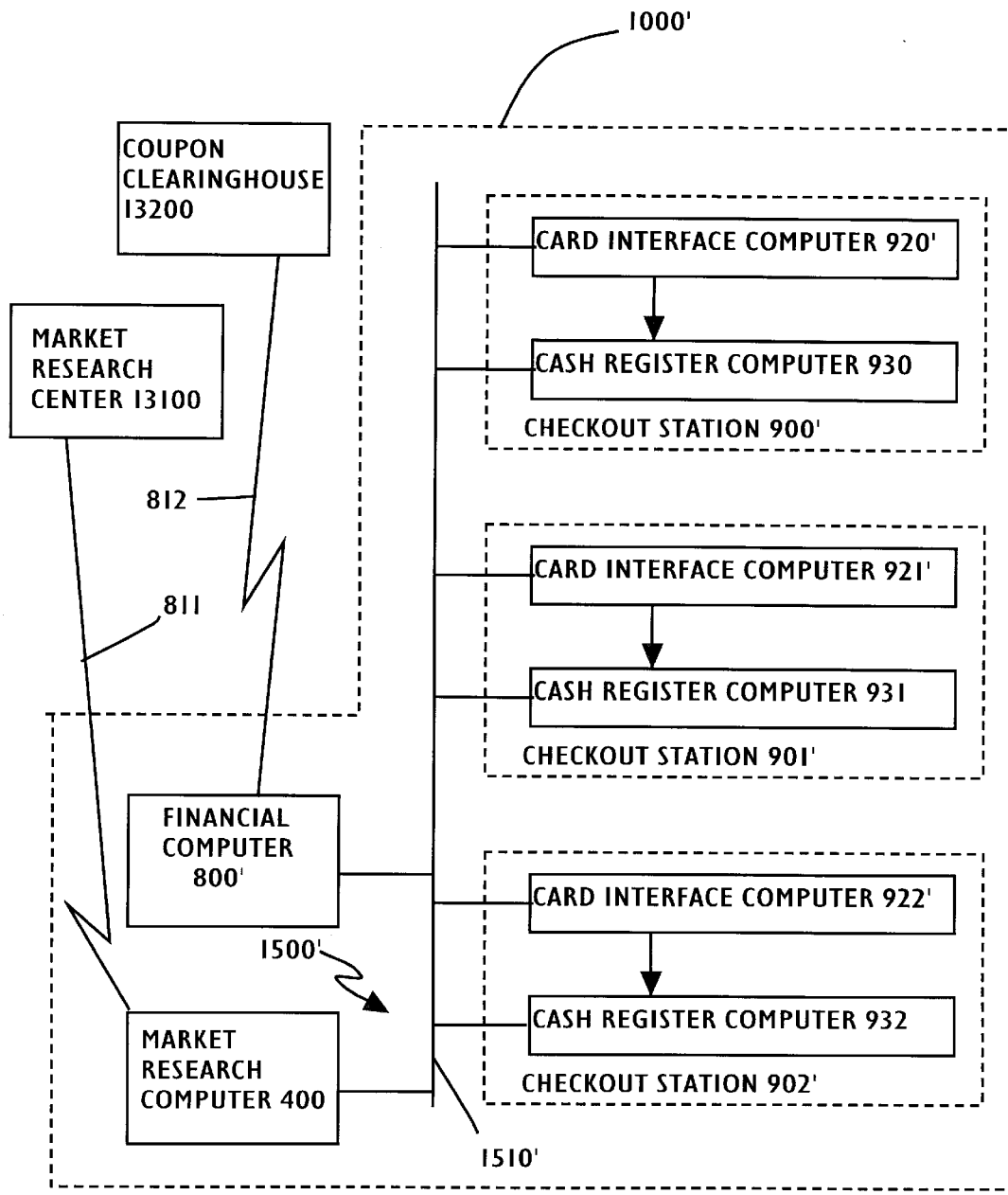
FIG. 24 is a block diagram of the second preferred computer network.

FIG. 24 shows a block diagram emphasizing another aspect of the second preferred system. Local Area Network (LAN) 1500' includes 8 computers: financial computer 800, market research computer 400, card interface computer 920', cash register computer 930', smart card computer 921', cash register computer 931, smart card computer 922', and cash register computer 932. Card interface computer 920 and cash register computer 930 are in checkout station 900', card interface 921 and cash register computer 931 are in checkout station 901', and card interface computer 922 and cash register computer 932 are in checkout station 902'. Each of these computers has a respective network address uniquely identifying the computer on network 1500'.

These computers can communicate with each other by sending data packets in a format conforming to the communication protocol of network 1500'.

Figure 25:
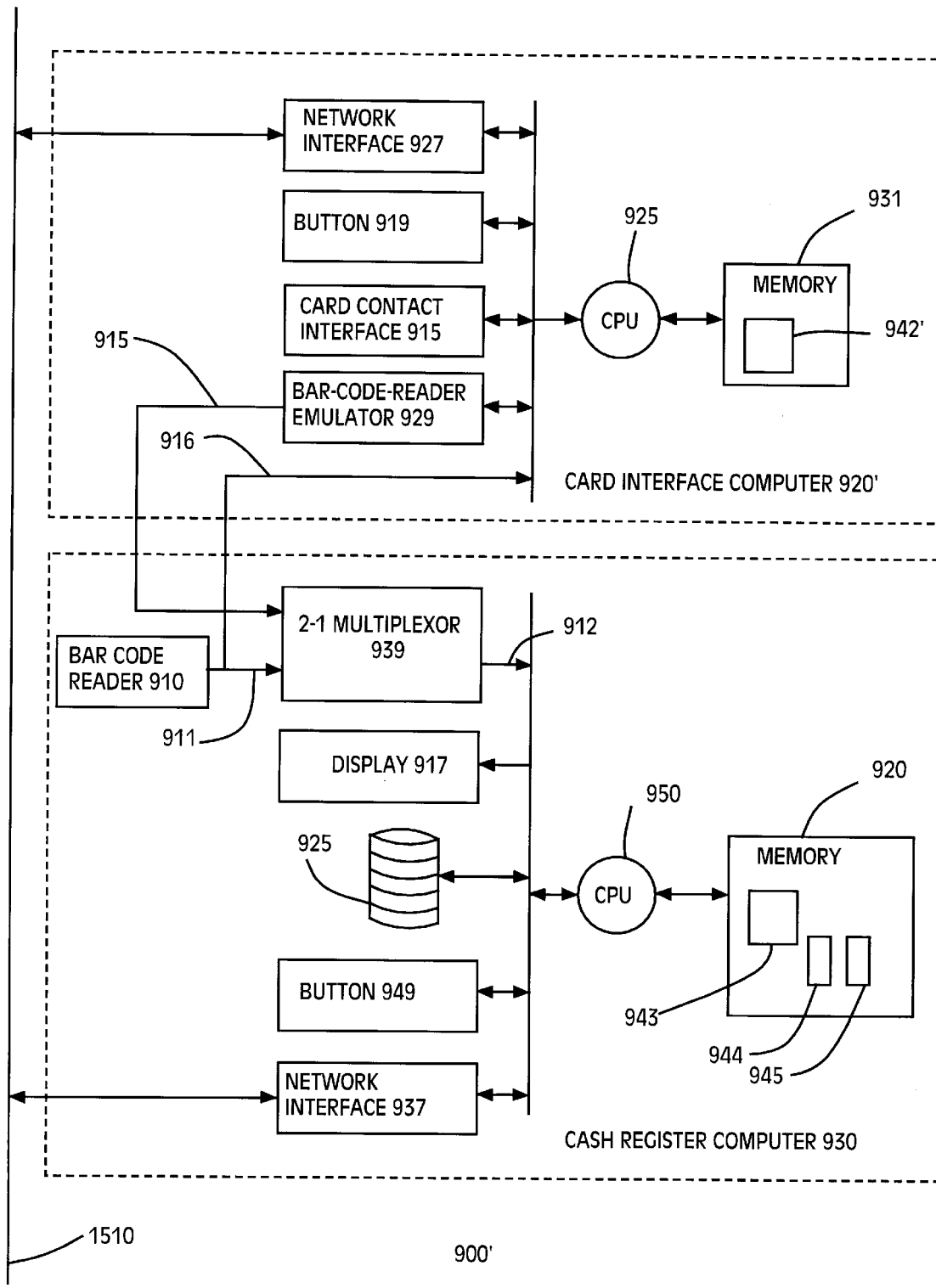
FIG. 25 is a block diagram of a check-out station in the second preferred system.

FIG. 25 is a block diagram of checkout station 900'. In card interface computer 920', CPU 925 executes program 942' in memory 933.

Figure 26:
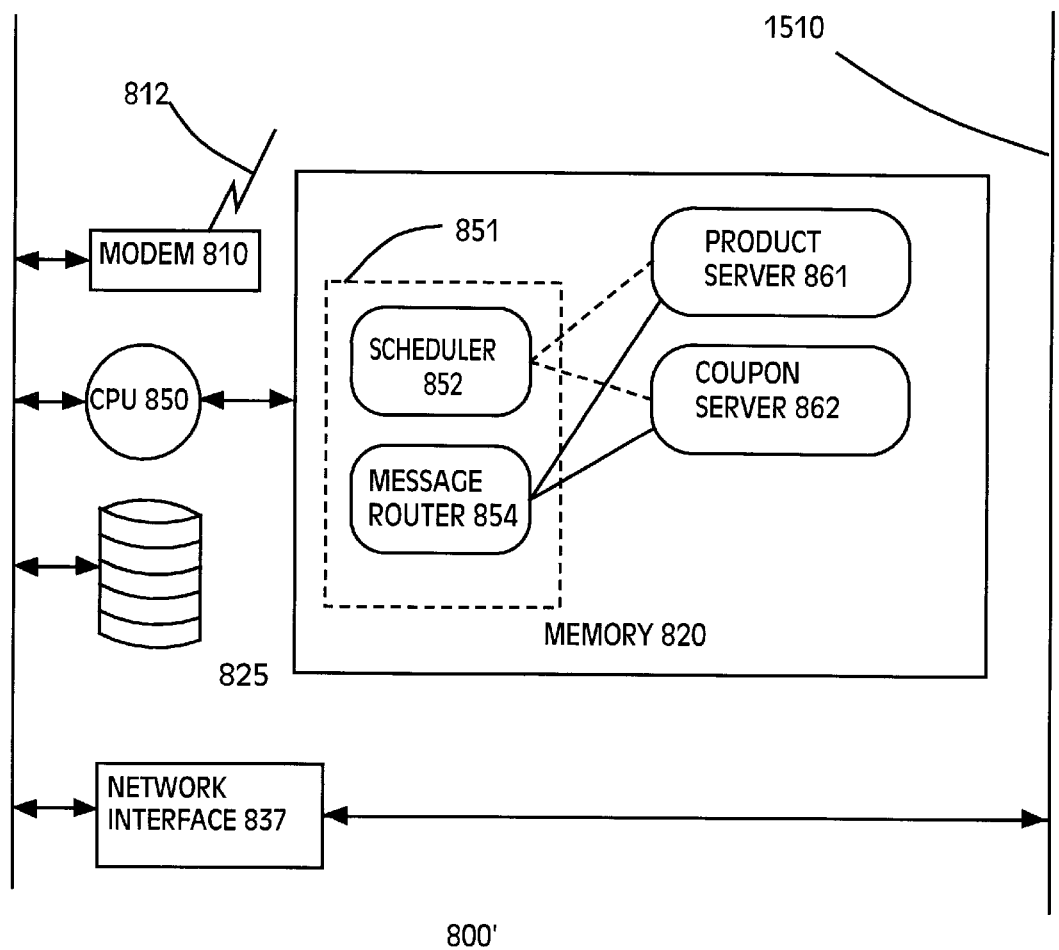
FIG. 26 is a block diagram of an in-store financial computer in the second preferred system.

FIG. 26 shows a block diagram of financial computer 800'. CPU 850 executes operating system 851 and application processes 861 and 862. Financial computer 800' is similar to financial computer 800 described in connection with the first preferred embodiment above, except that financial computer 800' does not have the market research server for forwarding market research data to the marketing research center.

Figure 27:
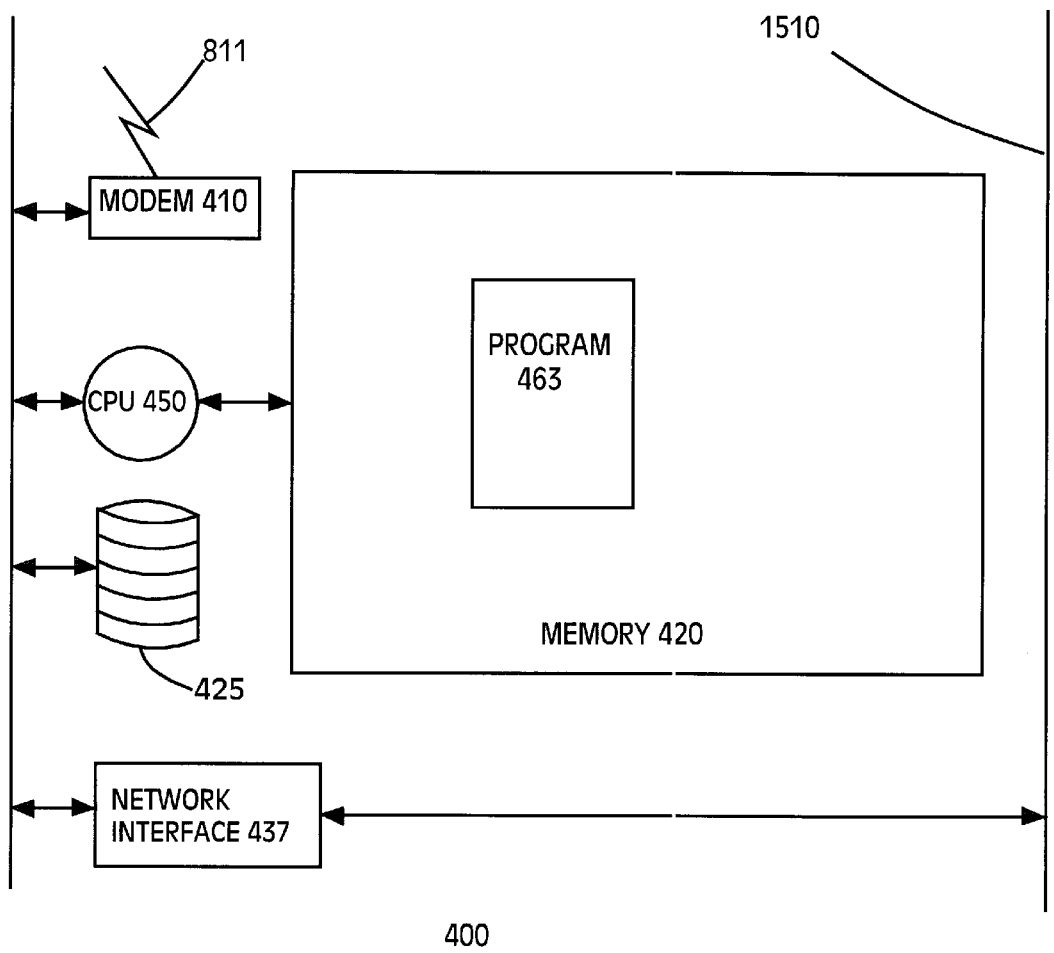
FIG. 27 is a block diagram of a market research computer on the computer network of the second preferred system.

FIG. 27 shows a block diagram of market research computer 400. CPU 450 executes program 463 in random access memory 420. Various parts of program 463 may be transferred between memory 420 and disk memory 425 using a virtual memory mapping scheme, as is well known in the art.

CPU 450 receives messages through network cable 1510 and network interface card 437. Periodically, program 463 sends redemption data to market research center 13100, via modem 1410 and telephone signal path 811. The redemption data sent to research center 13100 includes the identification of the store 1000', identification of the customers who redeemed electronic coupons, and identification of the coupons redeemed and of respective quantities of coupon redemptions.

Figure 28:
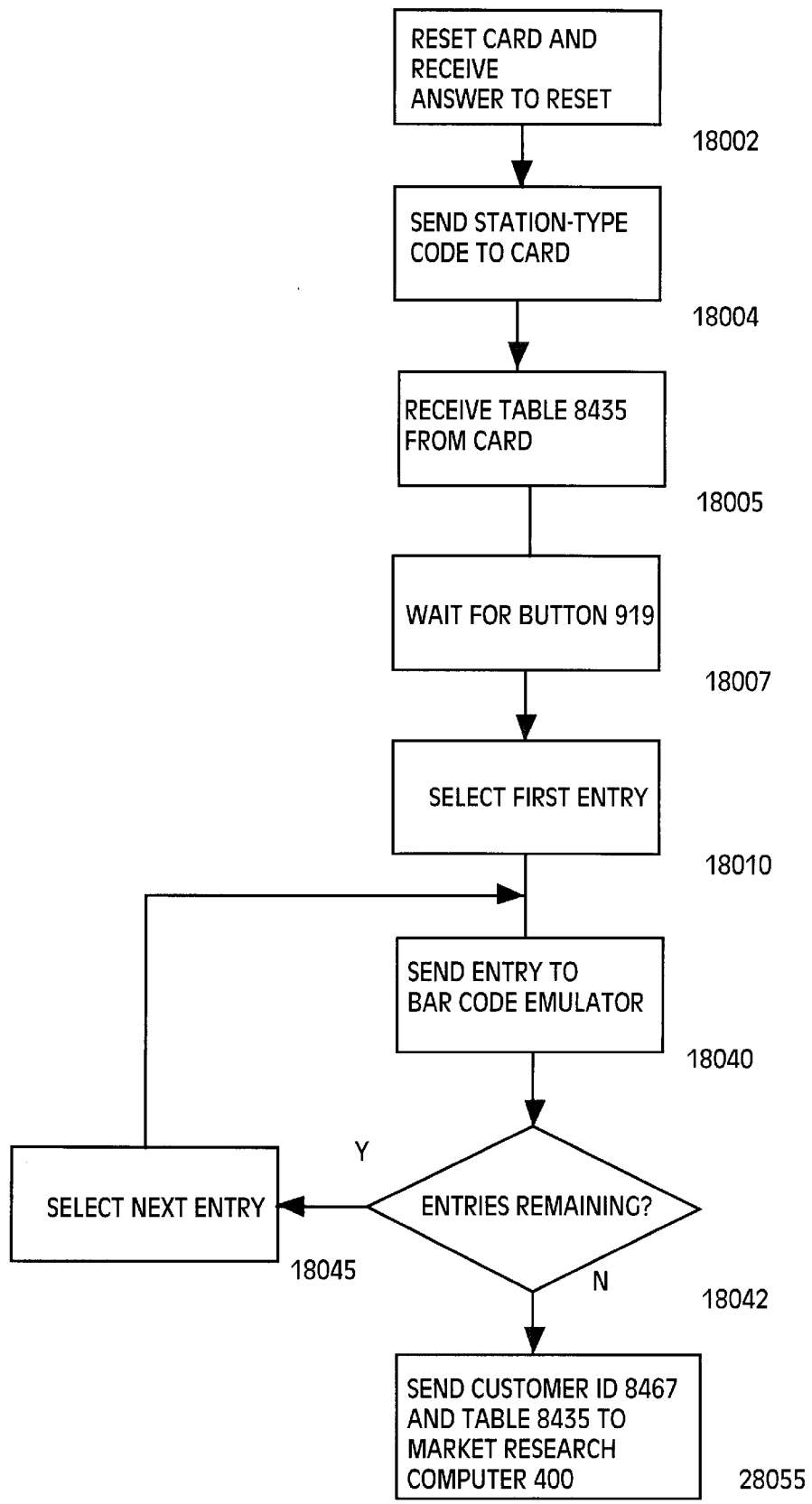
FIG. 28 is a flow chart of a processing performed by a part of a check-out station in the second preferred system.

FIG. 28 shows a processing performed by card interface computer 920'. The processing shown in FIG. 28 is similar to that described in FIG. 18B, in connection with the first preferred embodiment of the invention, except that FIG. 28 contains a step 28055: If there are no entries remaining, CPU 925 sends a redemption report message 3005' to market research computer 400.

In summary, each of computers 920 and 930 (each of two computers) has a respective network address uniquely identifying the computer in network 1500'. The preferred method includes the steps of executing the first program on a first computer, and executing the second program on a second computer.

The system also includes financial computer 800' having a respective network address uniquely identifying financial computer 800' in network 1500'. The preferred method includes sending, responsive to a product signal from bar code reader 910 (the third signal), packet 3002 shown in FIG. 8 (an inquiry signal) to financial computer 800'. Subsequently, the preferred method receives packet 3004 shown in FIG. 9 (a reply signal) from financial computer 800'. Packet 3004 includes a price for the product and a coupon family code for the product.

Thus, the second preferred system allows a supermarket having a network for processing price information to be augmented with card interface computer 920', 2-1 multiplexer 939, and market research computer 400, to practice the second preferred method of the invention, without requiring a change to software in the supermarket.

Thus, the preferred systems processes both product price data and customer buying pattern data.

The UCC/EAN-128 coupon extended code is documented in the UPC Coupon Code Guidelines Manual, Reprinted, October 1994, from the Uniform Code Council, Inc., Dayton, Ohio.

Although the illustrated cards have been shown with a relatively simple memory organization, more involved memory organizations are possible, allowing a single card to function in other applications in addition to functioning in an embodiment of the invention.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims.

What is claimed is:

1. A store for a system having a plurality of portable cards each having a card memory for storing coupons, the store comprising:

a network medium;

a roof structure;

a plurality of products under the roof structure;

a common computer, under the roof structure, that sends pricing signals for pricing products, through the network medium; and a plurality of cash register stations under the roof structure, each cash register station including
        a card interface for reading from the card memory of one of the portable cards;
        a first processing unit that executes a first program in a first memory,
        a first network interface coupled to the first processing unit and the network medium,
        a second processing unit that executes a second program in a second memory, the second processing unit being responsive to the card interface, the second processing unit generating a first signal corresponding to a product and sending the first signal to the first processing unit, and generating a second signal corresponding to a person,
        a second network interface coupled to the second processing unit and the network medium,
        an electromagnetic detector for generating a third signal corresponding to a product,
            wherein the first processing unit receives one of the pricing signals from the common computer, through the first network interface, and
            the first processing unit determines a price by processing the one of the pricing signals, the first signal from the second processing unit, and the third signal.

2. The store of claim 1 further including a plurality of paper substrates each having a surface for encoding a coupon, wherein the electromagnetic detector is capable of generating the first signal by detecting light reflected from the one of the paper substrates.

3. A system including the store of claim 1, further including a third memory for storing demographic signals for a plurality of persons; and a generator that generates a report by accessing the third memory using the second signal.

4. The system of claim 3 wherein the demographic signals include a date of birth.

5. The system of claim 3 wherein the demographic signals include an income level.

6. The store of claim 1 wherein the second processing unit sends the second signal through the second network interface.

7. The store of claim 1 wherein the second processing unit sends the first signal to the first processing unit via a signal path excluding the first and second network interfaces.

8. The store of claim 1 further including a translator, coupled between the first and second processing units, the translator acting to translate the first signal, sent by the second processing unit, into a signal emulating a format of the electromagnetic detector.

9. The store of claim 1 further including a multiplexor having a first input coupled to the second processing unit, a second input coupled to the electromagnetic detector, and an output coupled to the first processing unit.

10. The store of claim 1 wherein the second signal includes customer identification information.

11. The store of claim 1 wherein the second signal includes household identification information.

* * * * *